United States Patent
Ferm et al.

(10) Patent No.: US 10,287,482 B2
(45) Date of Patent: May 14, 2019

(54) PARTICLES CONTAINING ONE OR MORE CONTROLLED RELEASE CROSS-LINKED ACTIVE AGENTS

(71) Applicant: AKZO NOBEL CHEMICALS INTERNATIONAL B.V., Amersfoort (NL)

(72) Inventors: Paul Michael Ferm, Morristown, NJ (US); Klin Aloysius Rodrigues, Signal Mountain, TN (US); John Socrates Thomaides, Berkeley Heights, NJ (US); Stuart Holt, Highland Park, IL (US); Jian Zhou, Ridgefield, CT (US); Lei Zhang, Chappaqua, NY (US); Jannifer Sanders, Hixson, TN (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 1208 days.

(21) Appl. No.: 14/364,556

(22) PCT Filed: Dec. 20, 2012

(86) PCT No.: PCT/EP2012/076256
§ 371 (c)(1),
(2) Date: Jun. 11, 2014

(87) PCT Pub. No.: WO2013/092780
PCT Pub. Date: Jun. 27, 2013

(65) Prior Publication Data
US 2014/0338915 A1    Nov. 20, 2014

Related U.S. Application Data

(60) Provisional application No. 61/578,312, filed on Dec. 21, 2011, provisional application No. 61/728,961, filed on Nov. 21, 2012.

(30) Foreign Application Priority Data

Mar. 13, 2012 (EP) .................... 12159299

(51) Int. Cl.
*C09K 8/524*    (2006.01)
*C02F 5/12*    (2006.01)
(Continued)

(52) U.S. Cl.
CPC ............ *C09K 8/524* (2013.01); *C02F 5/10* (2013.01); *C02F 5/12* (2013.01); *C02F 5/14* (2013.01);
(Continued)

(58) Field of Classification Search
CPC ............ C09K 8/524; C09K 8/52; E21B 37/06
(Continued)

(56) References Cited

U.S. PATENT DOCUMENTS 3,827,977 A * 8/1974 Miles ................. C02F 5/125
                                                            166/279
5,089,150 A    2/1992 Hen
(Continued)

OTHER PUBLICATIONS

Search Report of corresponding EP Application No. 12159299.2, dated Jul. 26, 2012.
(Continued)

*Primary Examiner* — Catherine Loikith
*Assistant Examiner* — Ashish K Varma
(74) *Attorney, Agent, or Firm* — Matthew J. DeRuyter

(57) ABSTRACT

The present invention is directed to a cross-linked scale control agent particle comprising: a scale control agent and a cross-linker. The scale control agent is cross-linked by the cross-linker. The present invention is also directed to a cross-linked organic-based crystalline inhibitor particle comprising: an organic-based crystalline inhibitor and a cross-linker. The organic-based crystalline inhibitor is cross-linked by the cross-linker. The present invention is also directed to the use of cross-linkers which can also act as benefit agents and to the use of capping and extension agents
(Continued)

TIR spectrum indicating the shift from an acid carbonyl peak to an ester carbonyl peak.

which act as further benefit agents The present invention is further directed to a particle comprising more than one cross-linked active agents; the active agent may be a combination of a scale control agent and an organic-based crystalline inhibitor. The present invention is also directed to a method for producing the particles according to the present invention and methods for performing a mechanical fracturing operation, for reducing scale build up in an oil well and a cooling tower using the particles according to the present invention.

31 Claims, 1 Drawing Sheet

(51) Int. Cl.
| | |
|---|---|
| C02F 5/14 | (2006.01) |
| C02F 5/10 | (2006.01) |
| C09K 8/52 | (2006.01) |
| C09K 8/68 | (2006.01) |
| C09K 8/74 | (2006.01) |
| C09K 8/528 | (2006.01) |
| E21B 37/06 | (2006.01) |
| E21B 43/26 | (2006.01) |
| C02F 103/02 | (2006.01) |

(52) U.S. Cl.
CPC ............... *C09K 8/52* (2013.01); *C09K 8/528* (2013.01); *C09K 8/685* (2013.01); *C09K 8/74* (2013.01); *E21B 37/06* (2013.01); *E21B 43/26* (2013.01); *C02F 2103/023* (2013.01); *C02F 2303/08* (2013.01); *C02F 2303/22* (2013.01); *C02F 2305/14* (2013.01); *C09K 2208/32* (2013.01)

(58) Field of Classification Search
USPC .......................................................... 166/307
See application file for complete search history.

(56) References Cited

U.S. PATENT DOCUMENTS

| | | | |
|---|---|---|---|
| 5,964,291 A | 10/1999 | Bourne et al. | |
| 2004/0074644 A1* | 4/2004 | Kotlar | C09K 8/536 |
| | | | 166/279 |
| 2005/0159559 A1* | 7/2005 | Collins | C09K 8/516 |
| | | | 525/329.7 |
| 2006/0124301 A1 | 6/2006 | Gupta et al. | |
| 2011/0105368 A1 | 5/2011 | Welton | |
| 2012/0012326 A1 | 1/2012 | Darby et al. | |

OTHER PUBLICATIONS

Search Report and Written Opinion of corresponding International Application No. PCT/EP2012/076256, dated May 7, 2013.

* cited by examiner

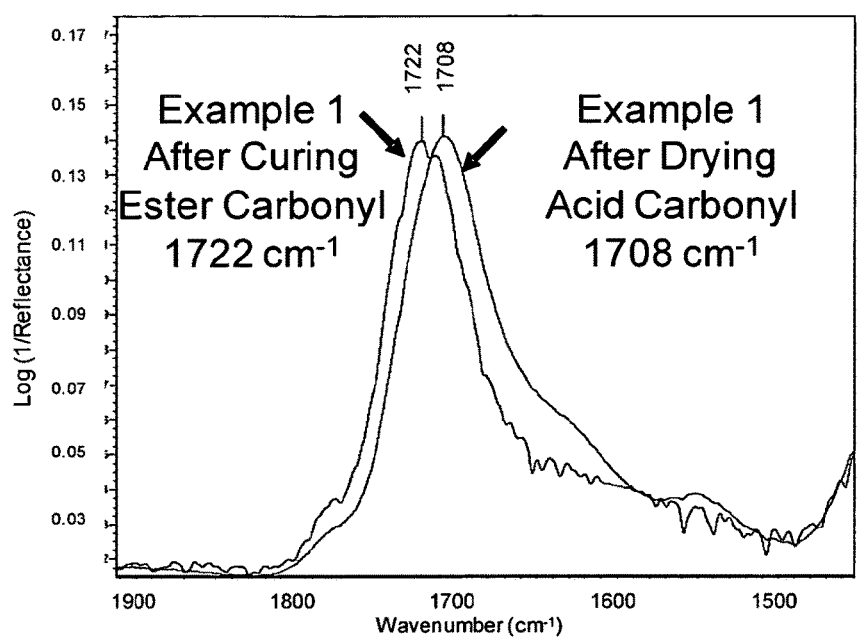
TIR spectrum indicating the shift from an acid carbonyl peak to an ester carbonyl peak.

PARTICLES CONTAINING ONE OR MORE CONTROLLED RELEASE CROSS-LINKED ACTIVE AGENTS

This application is a National Stage entry of International Application PCT/EP2012/076256, filed Dec. 20, 2012, which claims the benefit of U.S. Patent Application No. 61/578,312, filed Dec. 21, 2011, and European Patent Application No. 12159299.2, filed Mar. 13, 2012. The contents of the aforementioned applications are incorporated herein by reference in their entireties.

FIELD OF THE INVENTION

The present invention relates to controlled release cross-linked scale control agents, controlled release cross-linked organic-based crystalline inhibitors, the use of cross-linkers which can also act as benefit agents, the use of capping and extension agents which act as further benefit agents, and a particle comprising more than one cross-linked active agents. The present invention also relates to method of producing the cross-linked agents and the particle comprising more than one cross-linked active agents, and method of performing a mechanical fracturing operation using same.

BACKGROUND OF THE INVENTION

Scale is a slightly soluble inorganic salt, such as barium or strontium sulfate, calcium carbonate, calcium sulfate or calcium fluoride. In the oil production from the subterranean formations, the deposition of scale on surfaces and production equipment is a major production problem. Scale build-up decreases permeability of the formation, reduces well productivity and shortens the lifetime of production equipment. In order to clean scaled-up wells and equipment it is necessary to stop the production, i.e., by killing the well which is time-consuming and costly. After killing the well, squeezing is performed by injecting scale inhibitors into the well. Squeezing is therefore done after stimulation, e.g., mechanical fracturing, and requires the well production to be stopped. In a typical squeezing operation, fully dissolved scale inhibitor is pumped into the well and left to percolate for a period of 24 hours or longer. The scale inhibitor then either is consumed in the scale inhibition process or flows back out of the well as the well is again allowed to produce oil. In another approach, a continuous injection of liquid inhibitor via a pump into the well annulus, which is then pumped into the well bore near the production perforation. This technique only treats production fluid in the well bore.

Organic-based crystalline build up, such as paraffin and asphaltene, causes issues similar to those caused by scale build up. Similarly, in order to clean the organic-based crystalline build up, the well must be killed and squeezed as described above.

Previous solutions to the problem of reducing the cost and trouble of scale inhibitor squeeze operations, and in particular, the faster than desired depletion of scale inhibitor from subterranean formations have included squeezing cross-linked scale inhibitor gels or nanoparticles into a subterranean formation to moderately lengthen the effective life of the treatment and suspending very small cross-linked particles for percolation through subterranean formations. These nanoparticles were from 100 nanometer to less than 10 micron in size. These processes however negatively impact the formations since the gels and nanoparticles reduce the permeability of the rock formations and cause formation damage. Another solution includes a polymeric particle with covalently bound well treatment chemicals, however, this solution does not provide any particles comprising a functional cross-linked scale control agent and does not provide controlled release scale control. Other solutions have included particles for use in a frac operation together with standard high crush-resistant proppant particles in which the particles consist of porous high strength ceramic beads which are impregnated with scale inhibitor for inclusion. These particles, however, can only be loaded with a low level of scale inhibitor and because the scale inhibitor is only bound by physical forces within the pores of the ceramic bead, it is released much faster especially at high temperatures.

Yet another solution included a fluid suspension that contains a mixture of a particulate, a tackifying compound and a treatment chemical. The tackifying compound causes the treatment chemical to be stuck in the oilwell formation. Yet another solution included a scale inhibitor or a corrosion inhibitor in the form of particles that are coated, for example, with a dispersing agent.

However, there is still a need for controlled release scale control agent particles that have a high load of scale control agent controlled release and that could be used in a frac operation so that squeezing frequency needs could be dramatically reduced and oil producing wells could produce for much longer durations without having to be shut down for scale removal.

SUMMARY OF THE INVENTION

The present invention is directed to a cross-linked scale control agent comprising: a cross-linkable scale control agent and a cross-linker. The scale control agent is cross-linked by the cross-linker. The size of the particle is from about 5 microns to about 4000 microns. The amount of the scale control agent in the particle is from about 30 wt % to about 95 wt %.

The present invention is also directed to a cross-linked organic-based crystalline inhibitor particle comprising a cross-linkable organic-based crystalline inhibitor and a cross-linker wherein the organic-based crystalline inhibitor is cross-linked by the cross-linker. Further, the present invention is also directed to a particle comprising more than one cross-linked active agents. The cross-linked active agent may be a combination of at least one scale control agent and at least one organic-based crystalline inhibitor.

The present invention is also directed to a method for producing the cross-linked scale control agent. The method comprises the steps of: mixing a scale control agent and a cross-linker; subjecting the mixture to a temperature from about 20° C. to about 250° C. for up to about 72 hours; and sizing the temperature subjected mixture to obtain a particle size from about 5 micron to about 4000 microns. During the production method, the scale control agent is cross-linked by the cross-linker. The amount of the scale control agent in the particle is from about 30 wt % to about 95 wt % of the particle.

The present invention is further directed to a method for producing the cross-linked organic-based crystalline inhibitor particle as well as a method for producing the particle comprising more than one cross-linked active agents; they are somewhat similar to the method for producing the cross-linked scale control agent particle.

The present invention is further directed to a method of performing a mechanical fracturing operation using the cross-linked scale control agent particle, the cross-linked organic-based crystalline inhibitor particle, or the particle comprising more than one cross-linked active agents according to the present invention. The particle is mixed with proppant/sand and co-injected into a well to become lodged within a fracture region.

The present invention is also directed to a method of reducing scale build up in an oil well. In this method, the cross-linked scale control agent particle according to the present invention is held in a permeable container and suspended in a well bore, near well bore region, and/or rathole.

The present invention is further directed to a method of reducing organic-based crystalline build up in an oil well as well as a method of reducing a mixture of scale and organic-based crystalline build up in an oil well. These methods are similar to that of reducing scale build up in an oil well.

The present invention is also further directed to a method of reducing scale build up in a cooling tower water supply. In this method, the cross-linked scale control agent particle according to the present invention is held in a permeable container and suspended in cooling tower reservoir.

The present invention is also directed to a method for controlling a controlled release profile of a cross-linked scale control agent. The method includes the steps of: 1) determining a desired controlled release profile; 2) selecting a cross-linker based on the desired controlled release, profile; 3) determining a required amount of the cross-linker based on the selected cross-linker and the desired controlled release profile; and 4) cross-linking the scale control agent using the selected cross-linker.

The present invention is further directed to a method for controlling a controlled release profile of a cross-linked active agent. The method includes the steps of: 1) determining a desired controlled release profile; 2) selecting a cross-linker based on the desired controlled release profile; 3) determining a required amount of the cross-linker based on the selected cross-linker and the desired controlled release profile; and 4) cross-linking the active agent using the selected cross-linker.

BRIEF DESCRIPTION OF THE DRAWINGS

FIG. 1 illustrates Total Internal Reflectance (TIR) spectra of cross-linked scale control agent particles after an initial drying step and after a subsequent curing step.

DETAILED DESCRIPTION OF THE INVENTION

The present invention solves the above-mentioned problems by providing a scale control agent particle which is not readily soluble at room temperature and which has a large size equivalent to the size of a mechanical fracturing particle (about 5 to about 4000 microns). The particle has the proper mechanical properties such that it survives the mechanical fracturing operation (frac operation), which is typically carried out in the early stages of oilfield commissioning. In the frac operation, a "superhighway" for oil flow is created within the formation so that the diffusion distances to regions of high conductance are greatly reduced. A typical frac operation includes pressurization to separate the subterranean formation, the pumping of particles, and the release of pressure which is then distributed across the pack of proppant particles, called the sand pack where the proppant particles are lodged within a fracture region. Accordingly, the scale control agent particles according to the present invention must be sufficiently large, so that they are captured within the resulting sand pack and not immediately flushed out after the well is put back into operation.

The present invention is directed to a cross-linked scale control agent particle comprising: at least one scale control agent and a cross-linker. The scale control agent is cross-linked by the cross-linker. The size of the particle is from about 5 microns to about 4000 microns; in one embodiment, the size of the particle is from about 50 microns to about 4000 microns, in another embodiment, the size of the particle is from about 50 microns to about 1700 microns; in yet another embodiment from about 425 microns to 1400 microns. In a further embodiment, the size of the particle is from about 1000 microns to 4000 microns; and in another embodiment from about 425 microns to about 850 microns. In one embodiment, the size of the particle is primarily between about 250 to about 1100 microns in size as measured in the $10^{th}$ to $90^{th}$ percentile range of the particle size distribution. In a further embodiment, the size of the particle is primarily between about 500 to about 900 microns in size as measured in the $25^{th}$ to $75^{th}$ percentile range of the particle size distribution. Because of the large size of the present scale control agent particle which is similar to the size of a mechanical fracturing particle, such particle may be used in a frac operation or in conjunction with mechanical fracturing. This is also a convenient size for use with a permeable container to be placed in a well bore region, near well bore region, and/or rathole or for placement in a cooling tower for water treatment.

The amount of the active scale control agent in the particle is from about 30 wt % to about 95 wt %; in one embodiment the amount of the active scale control agent is from about 50 wt % to about 95 wt %; in another embodiment from about 65 wt % to about 95 wt %; and in yet another embodiment from about 80 wt % to about 95 wt %. The amount of scale control agent is calculated as the weight percentage of scale control agent relative to the total solids in the composition and is designated SCA wt %.

The ratio of cross-linkage moieties on the SCA to the cross-linking moieties on the cross-linker may be calculated. A convenient unit to express reactable moieties on a polymer or molecule is milliequivalents per grams. For instance, fully protonated polyacrylic acid contains around 14 meq/g of carboxylic acid (—COOH). This value can be calculated or determined experimentally by titration with a strong base such as sodium hydroxide. If desired, when preparing several cross-linked scale control agent particles formulations, the ratio of cross-linkable moieties to cross-linking moieties can be adjusted to be constant and thereby the relative impact different compounds can be determined. For instance, polyacrylic acid, which contains 14 meq/g —COOH moieties can be mixed with glycerol, which contains 32.3 meq/g hydroxyl (—OH) moieties. When combined in a mixture containing 83% SCA and 17% glycerol, the ratio of —COOH to —OH is 2.1.

The particle contains a very high amount of the active scale control agent which is cross-linked by ester bonds, amide bonds, imide bonds, phosphoester bonds, or combinations thereof. Examples of the scale control agent include, but are not limited to, polymers, oligomers, and small molecules of carboxylates, aminocarboxylates, acrylates, sulfates, sulfonates, phosphonates, phosphinos, and copolymers or mixed compounds thereof. The scale control agent may comprise polymers, oligomers, or copolymers of at least one ethylenically unsaturated monomer which may be classified as anionic, non-ionic, and cationic. In one embodiment, the polymer contains at least one ethylenically unsaturated monomer which is anionic and is called an anionic ethylenically unsaturated monomer. In one embodiment, the ethylenically unsaturated anionic monomer comprises acrylic acid, methacrylic acid, maleic acid, itaconic acid, 2-acrylamido-2-methyl propane sulfonic acid, or mixtures thereof.

It should be understood that the above-mentioned carboxylates, acrylates, sulfates, sulfonates, phosphonates, phosphinos, and aminocarboxylates can include the alkali metal salts thereof. Preferably, the scale control agent according to the present invention should include a substantial number of carboxylate groups for cross-linking. The copolymers can be created in either the metal ion salt form or the acid form.

As used herein, the term "anionic ethylenically unsaturated monomer" means an ethylenically unsaturated monomer which is capable of introducing a negative charge to the polymer that is the scale control agent. These anionic ethylenically unsaturated monomers can include, but are not limited to, acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid, maleic acid, and combinations thereof. Moieties such as maleic anhydride or acrylamide that can be derivatized (hydrolyzed) to moieties with a negative charge are also suitable. The preferred anionic ethylenically unsaturated monomers are acrylic acid, methacrylic acid, maleic acid, itaconic acid and 2-acrylamido-2-methyl propane sulfonic acid.

The non-ionic and cationic ethylenically unsaturated monomers are optional. As used herein, the term "nonionic ethylenically unsaturated monomer" means an ethylenically unsaturated monomer which does not introduce a charge in to the polymer that is the scale control agent. These nonionic ethylenically unsaturated monomers include, but are not limited to, acrylamide; methacrylamide; N-alkyl(meth)acrylamide; N,N-dialkyl(meth)acrylamide such as N,N-dimethylacrylamide; hydroxyalkyl(meth)acrylates; alkyl(meth) acrylates such as methylacrylate and methylmethacrylate; vinyl acetate; vinyl morpholine; vinyl pyrrolidone; vinyl caprolactum; ethoxylated alkyl; alkaryl or aryl monomers such as methoxypolyethylene glycol (meth)acrylate; allyl glycidyl ether; allyl alcohol; glycerol (meth)acrylate; monomers containing silane, silanol and siloxane functionalities; and combinations thereof. The nonionic ethylenically unsaturated monomer is preferably water soluble. Preferred nonionic ethylenically unsaturated monomers include acrylamide, methacrylamide, N-methyl(meth)acrylamide, N,N dimethyl(Meth)acrylamide, vinyl pyrrolidone, and vinyl caprolactam.

An example of a polyacrylate is a low molecular weight polyacrylic acid. Another example is a low molecular weight polymaleic acid. An example of an effective copolymer for scale control is the copolymer of acrylic acid and maleic acid with a mole ratio of 2:1. Other effective scale control agents are polymers that contain sulfonate groups. These polymers that are good scale control agents are well known in the art. Different aqueous environments, in particular where different ionic species are present, call for the addition of additional monomers which can mitigate the polymer precipitation due to presence of the electrolytes in solution. Calcium and iron are two ions which are often considered when selecting the polymers. For example, a copolymer of acrylic acid, maleic acid, methylmethacrylate, and 2-acrylamido-2-methyl propane sulfonic acid is useful in conditions where ion tolerance is required. An example of a polyphosphonate is diethylenetriamine penta(methylene phosphonic acid) (DTPMP); an example of a polyaminocarboxylate is glutamic acid diacetic acid (GLDA); and an example of a small molecule of polycarboxylate is citric acid. In one embodiment, Polymer A (further described in the Examples) is used as the scale control agent. In another embodiment, Alcosperse 602A, Polymer B, or Polymer C (both Polymers B and C are further described in the Examples) is used.

The cross-linker may be a polyol, a polyamine, an amino alcohol, a polyepoxide, or mixtures thereof. For purposes of this invention, a polyol may be described as a molecule having 2 or more hydroxyl groups. Examples of a polyol include, but are not limited to, glycerol, 1,6-hexanediol, pentaerythritol, and high molecular weight polyols (e.g., polyvinylalcohol). For purposes of this invention, a polyamine may be described as a molecule having 2 or more amine groups. Examples of a polyamine include, but are not limited to, diethylenetriamine (DETA), tris(2-aminoethyl) amine (Tris), 1,6-hexanediamine, and high molecular weight polyamines (e.g., polyvinylamine, polyethyleneamine, etc.). In one embodiment, at least two of the amine functionalities in the polyamine are primary or secondary. Examples of an amino alcohol include, but are not limited to, ethanolamine, diethanolamine, N-(2-hydroxylethyl)ethylenediamine, and N,N'-bis(2-hydroxyethyl)ethylenediamine. In one embodiment, at least one of the amine functionality in the amino alcohol is not tertiary. The polyepoxide include, but are not limited to, bisepoxides and polyepoxide functional compounds, such as butanediol diglycidyl ether. It should be understood that throughout the present specification, unless otherwise stated, the prefix "poly" encompasses the prefixes "di", "tri", "oligo", etc. For example, polyamine includes diamine, triamine, oligoamine, as well as polyamine.

In one aspect of the present invention, the cross-linker used in the present invention may act as a corrosion inhibitor upon release. Therefore, when this type of cross-linker is used in the particle, the particle provides scale controlling properties and corrosion inhibiting properties simultaneously. Examples of a cross-linker that may act as a corrosion inhibitor are alkyl polyamines. Any corrosion inhibitor that contains multiple free amine or multiple free alcohol functionalities are useful for this invention. In one embodiment, the alkyl polyamines are alkyldiamines and/or alkyltriamines. The alkyl polyamines include, but are not limited to, tallow propylenediamine, coco propylenediamine, tallow dipropylene triamine, and coco dipropylene triamine. Further examples of a cross-linker that may act as a corrosion inhibitor include, but are not limited to, N-tallow-1,3-diaminopropane (available from Akzo Nobel Surface Chemistry LLC as Duomeen C), N-tallow-1,3-tallowdiamine (available from Akzo Nobel Surface Chemistry LLC as Duomeen T), tallow dipropylene triamine (available from Akzo Nobel Surface Chemistry LLC as Triamine YT), ethoxylated (3) N-coco-1,3-diamine propane (available from Akzo Nobel Surface Chemistry LLC as Ethoduomeen C/13), ethoxylated (12) N-tallow-1,3-diamine propane (available from Akzo Nobel Surface Chemistry LLC as Ethoduomeen T/22), and ethoxylated (2) cocoalkylamines (available from Akzo Nobel Surface Chemistry LLC as Ethomeen C/12).

In another aspect of the present invention, the cross-linker used in the present invention may have biocidal activity upon release. Therefore, when this type of cross-linker is used in the particle, the particle provides scale controlling properties and biocidal properties simultaneously. Any biocide that contains multiple free amine or multiple alcohol functionalities are useful for this invention. Examples of a cross-linker that may have biocidal activity include, but are not limited to, N-(3-aminopropyl)-N-dodecylalkyl trimethylene diamines, distilled (available from Akzo Nobel Surface Chemistry LLC as Triamine Y12D), N-coco-1,3-diaminopropane or cocodiamine (available from Akzo Nobel Surface Chemistry LLC as Duomeen C), and tallow dipropylene triamine (available from Akzo Nobel Surface Chemistry LLC as Triamine YT). Ethoxylated quaternary amines (available from Akzo Nobel Surface Chemistry LLC under the trade name Ethoquad) are also useful for this invention for their corrosion inhibition and biocide activity.

In yet another aspect of the present invention, the cross-linked scale control agent according to the present invention may include a functional capping agent attached thereto. A capping agent is a molecule having one and only one reactive site, in particular an alcohol or free amine, that can react with an organic acid residue on the polymer (in this case, the scale control agent) and will block that organic acid residue from further reaction. In other words, a capping agent condenses with the organic acid residue on the organic acid-containing polymer (in this case, the scale control agent). Upon release/hydrolysis, such capping agent may have certain activities, e.g. corrosion inhibiting activity or biocidal activity. Examples of a capping agent that may act as a corrosion inhibitor include, but are not limited to, primary or secondary amines and alcohols. Primary or secondary amines and alcohols as capping agents may also have biocidal activity upon release. Further examples of a capping agent that act as a corrosion inhibitor and may also have biocidal activity include, but are not limited to, coco alkylamines (available from Akzo Nobel Surface Chemistry LLC as Armeen C), tallow alkylamines (available from Akzo Nobel Surface Chemistry LLC as Armeen T), and tall oil imidazoline (available from Akzo Nobel Surface Chemistry LLC as Armohib CI-209).

In a further aspect of the present invention, the cross-linked scale control agent according to the present invention may include a functional extension agent attached thereto. An extension agent is a molecule that has reactive groups that are self reactive and will also react with the organic acid residue on the polymer (in this case, the scale control agent). In other words, an extension agent is a molecule that has complementary reactive groups with respect to condensation reaction, one of which is capable of reacting with the organic acid residue on the polymer (in this case, the scale control agent), in particular an alcohol or free amine. Upon release/hydrolysis, such extension agent may have certain activities, e.g., acidizing activity or scale control activity. Examples of an extension agent that may have acidizing activity include but are not limited to general hydroxycarboxylic acids, amino acids, and, specifically, lactic acid. Lactic acid does not only possess acidizing activity but can also act as a scale control agent.

The cross-linked scale control agent according to the present invention has controlled release properties. The particle has a slow release rate in water which increases with increasing temperature. In one embodiment, the scale control agent is released from the particle continuously for a period of up to about 12 months at a temperature of up to about 200° C. In another embodiment, the scale control agent is released from the particle continuously for a period of up to about 12 months at a temperature of up to about 150° C. In yet another embodiment, the scale control agent is released from the particle continuously fora period of up to about 6 months at a temperature up to about 150° C. In yet another embodiment, the scale control agent is released from the particle continuously for a period of up to about 9 months at a temperature up to about 150° C. In a further embodiment, the scale control agent is released from the particle continuously for a period from about 3 months to about 6 months at a temperature about 150° C. In another embodiment, the scale control agent is released for up to about 12 months at 66° C. In yet another embodiment, the scale control agent is released for up to about 24 months at 66° C. In a further embodiment, the scale control agent is released for up to about 3 to 6 months at 66° C. In general, it is reasonable to invoke the Arrhenius equation in which for a thermally activated chemical reaction, such as hydrolysis, every 10° C. decrease in temperature, will reduce the rate of reaction by approximately a factor of two. Therefore, many further embodiments can be considered at temperatures below about 150 C, in which the scale control agent can be released for periods of days, weeks, and months and at some level adjusted to the desired time duration by the temperature of the application. Since the cross-linked scale control agent according to the present invention has controlled release properties, the scale control agent is released continuously for at least 12 hours at room temperature (15° C.-25° C.). In one embodiment, the scale control agent is released continuously for at least 18 hours at room temperature; in another embodiment, at least 24 hours at room temperature. It is noted that release of a scale control agent within a few minutes at room temperature is regarded as a natural dissolution rate of a granulated non-cross-linked scale control agent and thus is not considered controlled release.

The cross-linked scale control agent particle according to the present invention may be relatively soft and compressible. The compressibility of particles may be measured using a texture analyzer equipped with a 25 kg load cell and 7 mm diameter flat-tipped stainless steel rod or alternatively by using parallel plates between which particles can be compressed under load pressures. The particles can be measured in multiple configurations, including compressing the particles in a bed or matrix of identical particles; by compressing the particles mixed in a matrix of other particles (such as sand particles appropriate for frac operations); and, by placing individual particles between optical plates which can be compressed and through which the particles can be observed by optical microscopy. When examined either as a single particle or, as a 10-mm thick lightly packed bed of particles, in one embodiment the particles have a compressibility of about 30% at pressures about 10 MPa; and, of about 30% to 75% at pressures of about 100 to 1000 MPa, wherein under these pressures the final shape will be determined by the uniformity and geometry of the pressure applied and the generation of fine particles (fines) is observed to be minimal. In another embodiment, the particles have a compressibility of about 75% at pressures about 10 MPa; and, of about 75 to 90% at pressures of about 100 to 1000 MPa, wherein under these pressures the final shape will be determined by the uniformity and geometry of the pressure applied and the generation of fines is observed to be minimal. In yet another embodiment, the particles have a compressibility in size of about 10% to about 75% when compressed under pressure of up to about 10 MPa; in a further embodiment, of about 30% to about 75% when compressed under pressure of up to about 10 MPa. In another embodiment, the particles have a compressibility in size of about 10% to about 90% when compressed under pressure of up to about 1000 MPa; in a further embodiment, of about 30% to about 90% when compressed under pressure of up to about 1000 MPa.

The present invention is also directed to a cross-linked organic-based crystalline inhibitor particle comprising: at least one organic-based crystalline inhibitor and a cross-linker. The organic-based crystalline inhibitor is cross-linked by the cross-linker. Organic-based crystalline includes, but is not limited to, paraffin and asphaltene. An example of an organic-based crystalline inhibitor includes, but is not limited to, esterified copolymer Armohib PC-105 (available from AkzoNobel, listed as "alkenes, c20-24 .alpha.-, polymers with maleic anhydride, c20-28-alkyl esters"). An example of an asphaltene inhibitor includes Armohib PC-308 (available from AkzoNobel). In general, copolymers containing alpha-olefins copolymerized with acid functional monomer can be used in this invention.

In addition, the present invention is directed to a particle comprising more than one cross-linked active agents. The cross-linked active agent may be a combination of at least one scale control agent and at least one organic-based crystalline inhibitor. In other words, the particle may contain both a scale control agent and an organic-based crystalline inhibitor cross-linked with a cross-linker.

The size of the cross-linked organic-based crystalline inhibitor particle and the particle comprising more than one cross-linked active agents may be similar to that described above with respect to the cross-linked scale control agent particle. The amount of the total active inhibitor in those particles is similar to that of the active scale control agent described above. The ratio of cross-linkage moieties on the organic-based crystalline inhibitor to the cross-linking moieties on the cross-linker may be calculated similarly to that described above with respect to the scale control agent.

The cross-linked organic-based crystalline inhibitor particle may contain a very high amount of the active organic-based crystalline inhibitor which is cross-linked by ester bonds, amide bonds, imide bonds, phosphoester bonds, or combinations thereof. Similarly, the particle comprising more than one cross-linked active agents may contain a very high amount of the active organic-based crystalline inhibitor and the active scale control agent.

Similar cross-linkers described above with respect to scale control agent may be used to crosslink the organic-based crystalline inhibitor as well as the mixture of the organic-based crystalline inhibitor and the scale control agent.

As already mentioned above, in one aspect of the present invention, the cross-linker used in the present invention may act as a corrosion inhibitor upon release. Therefore, when this type of cross-linker is used in the particle, the particle provides organic-based crystalline inhibiting properties and corrosion inhibiting properties simultaneously; or organic-based crystalline inhibiting properties, scale controlling properties, and corrosion inhibiting properties simultaneously, depending on the cross-linked active agent(s) present in the particle.

In another aspect of the present invention, the cross-linker used in the present invention may also have biocidal activity upon release as described above. Therefore, when this type of cross-linker is used in the particle, the particle provides organic-based crystalline inhibiting properties and biocidal properties simultaneously; or organic-based crystalline inhibiting properties, scale controlling properties, and biocidal properties simultaneously, depending on the cross-linked active agent(s) present in the particle.

In yet another aspect of the present invention, the cross-linked organic-based crystalline inhibitor particle and the particle comprising more than one cross-linked active agents according to the present invention may include a functional capping agent attached thereto as described above. In a further aspect of the present invention, the cross-linked organic-based crystalline inhibitor particle and the particle comprising more than one cross-linked active agents according to the present invention may include a functional extension agent attached thereto as described above.

The cross-linked organic-based crystalline inhibitor particle and the particle comprising more than one cross-linked active agents according to the present invention has controlled release properties similar to those described above with respect to the cross-linked scale control agent. Additionally, The cross-linked organic-based crystalline inhibitor particle and the particle comprising more than one cross-linked active agents according to the present invention may be relatively soft and compressible similar to the cross-linked scale control agent particle as described above.

The present invention is also directed to a method for producing the cross-linked scale control agent particle according to the present invention. The method includes the steps of: mixing a scale control agent and a cross-linker; subjecting the mixture to a temperature from about 20° C. to about 250° C. for up to about 72 hours; and sizing the temperature subjected mixture to obtain a particle size from about 5 micron to about 4000 microns. During the production method, the scale control agent is cross-linked by the cross-linker. The amount of the scale control agent in the particle is from about 30 wt % to about 95 wt % of the particle.

The pH of the mixture of the scale control agent and the cross-linker may be adjusted to a pH optimum for cross-linking. The optimum pH for cross-linking depends on the scale control agent and/of the cross-linker used. The pH of the mixture of the scale control agent and the cross-linker may also be adjusted to a pH from about 2 to about 6. In one embodiment, where the cross-linker contains a polyamine cross-linker or a mixture of a polyamine and a polyol cross-linker, the pH of the scale control agent and the cross-linker mixture is from about 3.5 to about 5. In yet another embodiment, where the cross-linker contains a polyol cross-linker, the pH of the scale control agent and cross-linker mixture is from about 2 to about 4. An acid may be added to the mixture to achieve the desired pH level and if added, the acid is added in the mixing step. Acids suitable for use in the method include hard and fugitive acids. Examples of these acids include, but are not limited to, hydrochloric acid and sulfuric acid.

The mixture of the scale control agent and the cross-linker is subjected to a temperature from about 20° C. to about 250° C. for up to about 72 hours. In one embodiment, the mixture is subjected to heat at a temperature from about 150° C. to about 250° C. for about 5 seconds to about 180 minutes. In another embodiment, the mixture is subjected to heat at a temperature from about 170° C. to about 200° C. for about 5 seconds to about 120 minutes; in yet another embodiment from about 170° C. to about 200° C. for about 60 minutes to about 120 minutes. The heating may be performed by placing the material in a vessel which can be heated and from which water vapor can be removed. Heat can be provided to the vessel by steam, hot water, heated heat exchange fluids, or electrical heating elements. In addition, the mixture may first be spray atomized into droplets which are heated in a hot air stream, such as in a spray dryer.

In more detail, during the temperature subjecting step, the mixture may be first subjected to drying at temperatures from about 50° C. to about 100° C. for about 1 minute to about 60 hours. This wide range of drying times is due to the fact that drying time depends on the thickness of the layer being dried, the solvent used in the mixture, and the temperature and heat transfer of the drying method used. For instance, if a 1-cm to 10-cm layer of an aqueous liquid mixture is to be dried at 60° C., then the liquid mixture would be placed in a heated vessel, such as a drying pan, and the mixture would be heated for 24 to 60 hours. After this period, the mixture will be predominantly free of water. In another drying configuration, if a 0.1 to 3 mm thick layer of aqueous liquid mixture is to be dried on the surface of a dryer, for example a drum dryer, and the interior of the rotating drum dryer is heated to a temperature of 50° C., to 150° C., then the drying of the liquid mixture can be completed in a few seconds to a few minutes due to the much thinner thickness of the mixture on the drum surface. In another drying configuration, spray drying and fluid bed, the mixture solution is atomized in a spray nozzle to create a distribution of airborne droplets ranging in size from 5 microns typically to 1000 microns which are then dried in a hot air stream of temperatures typically from 60° C. to 350° C. In this case, the residence time of the atomized droplets are quite short typically 1 to 30 seconds after which the small particles are substantially dry and free of water.

In general, the drying step may be performed by simple or batch pan drying, lyophilizing, continuous drum drying, or spray drying. Preferably the drying step is performed by continuous drum drying or spray drying. When the temperature is held below about 150° C., for mixtures containing polyol and polyamine cross-linkers, then the resulting dry mixture will be predominantly non-cross-linked.

During the portion of the temperature subjecting step after drying, the temperature subjected mixture can undergo curing by cross-linking. To complete cross-linking, a sufficient temperature to activate the cross-linking chemical reaction is required. As measured by differential scanning calorimetry on a mixture of typical SCA polymers and polyamines described herein, the temperature required to activate appreciable cross-linking is greater than about 165° C. For some temperatures subjecting conditions the temperature required to activate appreciable cross-linking is greater than about 180° C. For mixtures of typical SCA polymers and polyols, the temperature required to activate appreciable cross-linking is in the range of 150° C. to 170° C. The required temperature required to activate typical SCA polymer and polyol can be reduced by the inclusion of a reducing agent such as sodium hypophoshonate to greater than around 130° C. to 150° C. Since the cross-linking reaction is a condensation reaction and releases water as a byproduct, it is necessary for ultimate complete curing and controlled release, that the water used as a solvent for the mixture be predominately removed before the curing step. Typical water levels present at the beginning of the temperature subjecting step leading to cross-linking are less than about 15 wt % of water. In another embodiment, water levels present at the beginning of the temperature subjecting step leading to cross-linking are less than about 10 wt % of water.

During the temperature subjecting step, a temperature above about 150° C. may be chosen to both dry and then subsequently partially or fully cross-linking the mixture in a single process step. Especially if water is used in the aqueous mixture, applying this temperature to the mixture will ensure that the mixture is first dried and then cured by cross-linking.

In the case wherein non-water solvents are used to create liquid mixtures, other temperatures appropriate to this solvent mixture can be used. Such solvents can include alcohols, such as methanol, ethanol, and isopropanol, and halogenated solvents, such as trichloroethylene. In the case wherein the cross-linking agent to create the final cured sample is an polyepoxide, the temperature required to activate the cross-linking reaction can be substantially lower down to about room temperature.

The temperature subjected mixture is sized to obtain a particle size from about 5 microns to about 4000 microns. In one embodiment, the temperature subjected mixture is sized to obtain a particle size from about 50 microns to about 4000 microns; in another embodiment from about 425 microns to 1400 microns; and in another embodiment from about 1000 microns to 4000 microns. In another embodiment, the temperature subjected mixture is sized to obtain a particle size from about 50 microns to about 1700 microns; in another embodiment, from about 425 microns to about 850 microns. In yet another embodiment, the temperature subjected mixture is sized to obtain a particle size that is primarily between about 250 to about 1100 microns in size as measured in the $10^{th}$ to $90^{th}$ percentile range of the particle size distribution. In a further embodiment, the temperature subjected mixture is sized to obtain a particle size that is primarily between about 500 to about 900 microns in size as measured in the $25^{th}$ to $75^{th}$ percentile range of the particle size distribution.

A reducing agent may optionally be added to the mixture containing the scale control agent and the cross-linker to promote cross-linking. Examples of a reducing agent include, but are not limited to, sodium hypophosphonate.

Optionally, prior to the sizing step, the mixture that includes the scale control agent and the cross-linker may be compacted to create dense particles. Compaction may be carried out in a compaction device that delivers pressures of about 1000 to about 5000 pounds per square inch, more preferably about 10000 to about 40000 pounds per square inch. One type of compaction device is a hydraulic press which can be used to press die fittings of any type towards one another under high pressures. When fitted with two opposing concave die faces, a tablet or pill can be compressed at from low pressures up to about 50,000 pounds per square inch. Other compaction devices include mills and roller compaction devices in which heavy steel roller wheels counter rotate and material pulled into the resulting nip can be compressed at similarly high pressures A compression aid or a weighting agent may be optionally blended with the cross-linked scale control agent during compaction. Examples of weighting agents include barium sulfate, calcium carbonate, and hematite. Examples of a compression aid include, but are not limited to synthetic and natural polymers; starches that gel but dissolve slowly in aqueous conditions, e.g., National 1215, Purity Gum 59, and N-Lite D starches; elastomeric compression aids such as thermoplastic and thermoset resins, with varying amounts of elasticity to modify the particle properties. Examples of these resins include, but are not limited to, AkzoNobel PR 10101 epoxy acrylate resin and polysulfide resins manufactured by AkzoNobel. Thermoplastic compression aids include, but are not limited to, polyethylene, polyvinylidene chloride, and polylactic acid. In addition, the temperature subjected mixture which is dry and which includes the scale control agent and the cross-linker (and optionally an acid and a reducing agent) may also be used as a compression aid.

Compression aids may control the final particle density and mechanical properties, such as a reduced friability. These compression aids are preferably added at low levels to keep the active scale control agent concentration high.

After sizing, the sized mixture may be heated to a temperature from about 100° C. to about 250° C. for about 1 minute to about 12 hours to further ensure desired amount of cross-linking. The sized mixture may be a mixture that has or has not been compacted and then sized as described above, or a mixture that has been compacted, blended with a compression aid or a weighting agent and then sized as described above. In one embodiment, the sized mixture is heated to a temperature from about 150° C. to about 250° C. for about for about 1 minute to about 120 minutes; in another embodiment, from about 170° C. to about 200° C. for about for about 1 minute to about 120 minutes; in yet another embodiment, from about 170° C. to about 200° C. for about for about 40 minutes to about 80 minutes. Methods for this further temperature subjecting step can include batch process in ovens, oven conveyer systems, and fluid bed systems.

The present invention is also directed to a method for producing the cross-linked organic-based crystalline inhibitor particle as well as a method for producing the particle comprising more than one cross-linked active agents. The methods are somewhat similar to the method for producing the cross-linked scale control agent particle as described above. It would be apparent to one skilled in the art to substitute the scale control agent in the above-described method with either an organic-based crystalline inhibitor or a mixture of a scale control agent and an organic-based crystalline inhibitor to obtain the cross-linked organic-based crystalline inhibitor particle or the particle comprising more than one cross-linked active agents according to the present invention, respectively. It would also be apparent to one skilled in the art to match the relative hydrophobic or hydrophilic nature of the cross-linker and polymer to assure an intimate mixture for cross-linking. Further, it would be apparent to one skilled in the art to use a mixture of the materials to create an intimate mixture for the purpose of cross-linking. This mixture can also include the use of a mixed solvent for greater compatibility. Finally, the creation of microemulsions, with very small domains, can be used to substantially mix the different materials and allow for cross-linking in the process of this invention.

Proper control of the initial amount of cross-linking, the compaction pressures and method, and the final amount of cross-linking can result in final particles with an optimal balance of controlled release kinetics and particle toughness and compressibility. It has been found that the cross-linking (post-curing or the heating of the compacted and sized particles) of the compacted and sized particles made of partially cross-linked powder (mixture) creates a much more robust particle (i.e., less friable) than if the compacted and sized particles are made of substantially fully cross-linked powder (mixture). Therefore, it is desirable that the mixture of the scale control agent (or the organic-based crystalline inhibitor or mixture thereof) and the cross-linker be temperature subjected at least twice (the initial to partially cross-link the scale control agent (or the organic-based crystalline inhibitor or mixture thereof) and the latter to fully cross-link the scale control agent (or the organic-based crystalline inhibitor or mixture thereof), with the compacting and sizing steps in between).

The cross-linked scale control agent according to the present invention has a slow release rate in water which increases with increasing temperature. Different scale control agents may be linked with different cross-linkers to provide a specific release profile versus time and temperature. For example, a polyol (e.g., glycerol) cross-linker provides a faster release profile; meanwhile, a polyamine cross-linker (e.g. diethylenetriamine) provides a slower release profile. Mixed amino alcohols can also be used, such as ethanolamine, diethanolamine, N-(2-hydroxyethyl)ethylenediamine, or N,N'-bis(2-hydroxyethyl)ethylenediamine. Mixtures of the above cross-linkers can be used and can control the ultimate release and dissolution rate of the final cross-linked controlled release scale control agent particle. Accordingly, the present invention is also directed to a method for producing a cross-linked scale control agent particle having controlled release properties wherein the cross-linker is selected based on the desired controlled release profile. As used herein, "controlled release" means the attribute indicating that a desired substance, in this case the scale control agent or the cross-linker, is released to the target environment in a controlled fashion, rather than immediately or instantaneously. It is understood that the scale control agent or the cross-linker may be released in a period of time as short as several seconds at a high temperature or as long as several months.

Similar concept may be applied to the cross-linked organic-based crystalline inhibitor particle as well as the particle comprising more than one cross-linked active agents. Accordingly, the present invention is also directed to a method for producing a cross-linked organic-based crystalline inhibitor particle or a particle comprising more than one cross-linked active agents wherein the cross-linker is selected based on the desired controlled release profile.

In addition, the present invention is also directed to a method for controlling a controlled release profile of a cross-linked scale control agent particle. The method includes the steps of determining a desired controlled release profile, selecting a cross-linker based on the desired controlled release profile, determining a required amount of the cross-linker based on the selected cross-linker and the desired controlled release profile, and cross-linking the scale control agent using the selected cross-linker. Further, the size and/or the compressibility of the particles may be matched with the size and pressure conditions of the end-use environment, e.g., the size of the sand particles used in the oil well, or the pressure conditions of the oil well. As such, the cross-linked scale control agent particle according to the present invention may be tailored to the needs of the different oilfield applications. Similar concept may be applied to the cross-linked organic-based crystalline inhibitor particle as well as the particle comprising more than one cross-linked active agents. Accordingly, the present invention is also directed to a method for controlling a controlled release profile of a cross-linked organic-based crystalline inhibitor particle or a particle comprising more than one cross-linked active agents.

The present invention is also directed to a method for performing a mechanical fracturing operation using the cross-linked scale control agent particle, the cross-linked organic-based crystalline inhibitor particle, or the particle comprising more than one cross-linked active agents according to the present invention. The method includes the steps of mixing the particle with proppant and/or sand, and co-injecting the mixture into a well. The mixture becomes lodged within a fracture region.

In addition, the present invention is also directed to a method for reducing scale build up in an oil well using the cross-linked scale control agent particle according to the present invention. Scale formation is a major problem in oilfield applications. Subterranean oil, recovery operations can involve the injection of an aqueous solution into the oil formation to help move the oil through the formation and to maintain the pressure in the reservoir as fluids are being removed. The injected water, either surface water (lake or river) or seawater (for operations offshore) can contain soluble salts such as sulfates and carbonates. These salts tend to be incompatible with ions already present in the oil-containing reservoir (formation water). The formation water can contain high concentrations of certain ions that are encountered at much lower levels in normal surface water, such as strontium, barium, zinc and calcium. As conditions affecting solubility, such as temperature and pressure, change within the producing well bores and topsides, partially soluble inorganic salts such as barium sulfate and calcium carbonate often precipitate from the production water. This is especially prevalent when incompatible waters are encountered such as formation water, seawater, or produced water.

Barium sulfate or other inorganic supersaturated salts such as strontium sulfate can precipitate onto the formation forming scale, thereby clogging the formation and restricting the recovery of oil from the reservoir. These salts can form very hard, insoluble scales that are difficult to prevent. The insoluble salts can also precipitate onto production tubing surfaces and associated extraction equipment, limiting productivity, production efficiency and compromising safety. Certain oil-containing formation waters are known to contain high barium concentrations of 400 ppm and higher. Since barium sulfate forms a particularly insoluble salt, the solubility of which declines rapidly with increasing temperature, it is difficult to inhibit scale formation and to prevent plugging of the oil formation and topside processes and safety equipment.

The cross-linked scale control agent particle according to the present invention, however, may be used to reduce such scale formation. As noted above, the present invention is also directed to a method for reducing scale build up in an oil well using the cross-linked scale control agent particle according to the present invention. The method includes the steps of holding the cross-linked scale control agent particle in a permeable container, such as a wire-mesh basket, and suspending the container in a well bore, near well bore region, and/or rathole. The wire mesh basket would have small pores such that the non-dissolved particle would not pass through the pores, but dissolved scale control agent would pass freely.

The present invention is further directed to a method of reducing organic-based crystalline build up in an oil well as well as a method of reducing a mixture of scale and organic-based crystalline build up in an oil well. These methods are similar to that of reducing scale build up in an oil well described above.

Further, the present invention is directed to a method for reducing scale build up in a cooling tower water supply using the cross-linked scale control agent particle according to the present invention.

Water treatment includes prevention of calcium scale due to precipitation of calcium salts such as calcium carbonate, calcium sulfate and calcium phosphate. These salts are inversely soluble, meaning that their solubility decreases as the temperature increases. For industrial applications where higher temperatures and higher concentrations of salts are present, this usually translates to precipitation occurring at the heat transfer surfaces. The precipitating salts can then deposit onto the surface, resulting in a layer of calcium scale. Calcium scale can lead to heat transfer loss in the system and cause overheating of production processes. This scaling can also promote localized corrosion.

The cross-linked scale control agent particle according to the present invention, however, may be used to reduce such scale formation. As mentioned above, the present invention is directed to a method for reducing scale build up in a cooling tower water supply using the cross-linked scale control agent particle according to the present invention. The method includes the steps of holding the cross-linked scale control agent particle in a permeable container, such as a wire-mesh basket, and suspending the basket in a cooling tower reservoir. Again, the wire mesh basket would have small pores, such that the non-dissolved particle would not pass through the pores, but dissolved scale control agent would pass freely.

Lastly, it is also contemplated herein that the cross-linked scale control agent particle, the cross-linked organic-based crystalline inhibitor particle, or the particle comprising more than one cross-linked active agents according to the present invention may be impregnated into porous insoluble inorganic materials in particle or granule form which are partially or wholly used as proppant articles as disclosed in U.S. Pat. No. 5,964,291, the entire disclosure of which is incorporated by reference herein. The cross-linked scale control agent particle, the cross-linked organic-based crystalline inhibitor particle, or the particle comprising more than one cross-linked active agents according to the present invention may also be adsorbed on porous surfaces within a proppant and/or embedded in the bulk porosity of the proppant as disclosed in U.S. Patent Application Publication No. 2009/038799, the entire disclosure of which is incorporated by reference herein.

The present invention will be further described in the following non-limiting examples.

Examples 1 to 3

Three different cross-linked scale control agent particles were prepared and the details of preparation are summarized in the table below as Examples 1-3.

Preparation of Polymer A: An initial charge consisting of 141 grams of water, maleic anhydride 37.3 grams, and 15.4 grams of sodium hydroxide (50% solution) to partially neutralize the maleic acid was added to a reactor and the temperature was raised to 80-85 C. To this initial reactor charge, 0.0352 grams of ferrous ammonium sulfate, hexahydrate, was added. A mixture containing 71.6 grams of acrylic acid, 69.4 grams of methyl methacrylate and 42.3 grams of 50% AMPS solution was added to the reactor over 4 hours. An initiator solution containing 8.7 grams of sodium persulfate and 29.1 grams of 35% hydrogen peroxide dissolved in 14 grams of water was added over 4 hours. The reaction mixture was held at 85 C for an additional 30 minutes. A solution of 2 grams of erythorbic acid dissolved in 16 grams of water was added as a shot. A solution of 2 grams of tert-butylhydroperoxide (70% solution) dissolved in 16 grams of water was added as a shot. The reaction mixture was heated at 85 C for another hour.

To make each Example, a 100-g sample of Polymer A on a dry-weight basis (232 grams of a 43 wt % aqueous solution) was selected as the polycarboxylate scale control agent (SCA) polymer. To this mixture, 7.5 g of 35 wt % hydrochloric acid obtained from Sigma-Aldrich of St. Louis, Mo., was slowly added over 2 minutes by pipette to the polymer solution, which was being stirred at 250 rpm on a magnetic stir plate, while the temperature of the solution was monitored by a Type K thermocouple probe. A pH change from 2.8 to 2 for each solution was confirmed during the addition of acid using a Orion 5 Star pH meter and Orion 9165BNWP Ag/AgCl pH probe obtained from Thermo Scientific of Beverly, Mass. For each Example 1 to 3, varying amounts of glycerol (propane-1,2,3-triol) from 4.5 g to 36.3 g was slowly added over 2 minutes by pipette to each polymer solution. Glycerol (99% assay) was obtained from Sigma-Aldrich of St. Louis, Mo. No appreciable rise above room temperature was noted due to addition of glycerol. The final percent weight of SCA relative to total solids (SCA wt %) was calculated for all samples and varied from 83% to 93%, as shown in Table 1.

During the initial drying step, the solutions were poured into an open 9"×12" aluminum tray and put in a forced-air oven at 60° C. to dry for 48 hours. After cooling to room temperature, the formulations were solid. When 0.3 g of the substantially dried formulation was added to 15 g of deionized water, the material visibly dissolved at room temperature within 5 minutes. This was typical of normal dissolution of a dried water-soluble polymer and at this point demonstrated negligible controlled release characteristics.

During a subsequent curing step, the dried formulations were placed in a forced air oven set at 180° C. for 50 minutes. The materials were then removed and were noted to have turned from a pale white to a golden brown color. The material was then placed in a blender (available from Blendtec in Orem, Utah) and ground to form granules that were sifted through a 20- and 40-US Std. mesh sieves. The 20 to 40 mesh sieve fraction provided particles primarily between 425 micron and 850 micron in diameter which were used in subsequent controlled release tests.

A TIR (Total Internal Reflectance) spectra of Example 1 both after the drying step and also after the curing step were carried out by finely grinding small samples and pressing them onto the quartz optic on a Nicolet iS10 FT-IR Spectrometer, available from Thermo Scientific of West Palm Beach, Fla. The TIR spectra are shown in FIG. 1. Not to be bound by theory, this FIGURE showed peaks corresponding to carboxylic acid which were shifted to peaks corresponding to esters.

The controlled release rate measurement method consisted of placing 0.3 gram of cured, sieved sample into a 30-ml glass vial with 20 ml of deionized water. Each test sample had an equivalent total solid dose of 1.5 wt % of final solids. For each formulation, the amount of cross-linker and scale inhibition polymer varied, therefore the active in solution was corrected by the weight percent of scale control agent contained in each cured sample, which was calculated from the formulation ratios. This value is denoted as "SCA wt %" and is shown Table 1 and subsequent tables and examples. For instance, the release test solution of Example 1 contained 0.30 g of solid and SCA wt % was 83%. Therefore, the added sample contained 0.249 g of SCA and the 20-ml test solution contained at most 12450 ppm SCA. The test solution was aged for 8 days at 38 C in an oven. After this time, a 0.0264-g sample of the test solution supernatant was diluted to a total of 9.94 g using deionized water, which was a total dilution factor of 377. The diluted solution was found to have a polymer concentration of 20.5 ppm, determined using the coacervation-turbidity titration method described below. The original aged solution therefore had a concentration of 7719 ppm, which was 62% of the 12450-ppm level expected, if all of the polymer had dissolved. All of the "Total SCA Release" values in Table 1 and subsequent tables were calculated in this way and were given in unit of percent (%) and represented the percentage of available SCA released into solution after the specified aging time.

The concentration of polymer in solution was measured using a coacervation-turbidity titration method and meter (Masters MP-9500 Meter and MP-9500 Reagents available from Masters Company Incorporated of Wood Dale, Ill.). Prior to measurement of samples, the meter was calibrated to a series of diluted polymer solutions in the range of 3 to 30 ppm, which was the region where the meter was most sensitive. Calibration measurements were done both with polymer control samples dissolved in deionized water and also in synthetic sea water. All measurement dilutions were carried out with deionized water. A small aliquot of test solution supernatant for each Example was then tested at various times during the aging process. These times were typically 1, 2, 4, 8, 15, 30, 60, 90, and 180 days and typical test temperatures were room temperature, 38° C., 66° C., 80° C. and 150° C. The small supernatant aliquots were always diluted by estimation to a concentration between 5 and 30 ppm. The released SCA polymer concentration was obtained as the concentration of the diluted SCA polymer times the dilution factor.

Total SCA Release after 8 days at both 38° C. and 66° C. were summarized for Example 1 to 3 in Table 1.

TABLE 1

|  | Example | | |
| --- | --- | --- | --- |
|  | 1 | 2 | 3 |
| Glycerol Cross-linker amount [g] | 18.1 | 9.1 | 4.5 |
| SCA wt % - calculated in Final Solids | 83% | 89% | 93% |
| Total SCA Release after 8 days (aged at 38° C.) | 11% | 30% | 45% |
| Total SCA release after 8 days (aged at 66° C.) | 62% | 82% | 89% |

For Example 1, which contained 83 wt % SCA, the Total SCA Release was 11% after 8 days aging at 38° C. For Example 3, which contained 93 wt % SCA, the Total SCA Release was 45% after 8 days aging at 38° C. In all cases, these values represented demonstrable controlled release of scale control agent over immediate dissolution of a control sample that was dried but not cured.

For Example 1, the Total SCA Release was 62% after 8 days aging at 66° C., whereas the Total SCA Release was 89% for Example 3. The tested particles of Example 3 were visually examined after 8 days aging at 66° C. and confirmed to be substantially dissolved. For both aging temperatures, it was seen that as the SCA wt % increased from 83 wt % to 93 wt %, the Total SCA release at day 8 also increased.

In conclusion, by adjusting the wt % percent of cross-linker in the mixture of scale control agent and cross-linker, Total SCA Percent Release could be controlled over a wide range at different aging temperatures and times.

Example 4

A cross-linked scale control agent particle was prepared and details are summarized in the Table 2 below as Example 4. A 100-g sample of Polymer A on a dry-weight basis (232 grams of a 43 wt % aqueous solution) was selected as the polycarboxylate scale control agent (SCA) polymer. The polymer solution was stirred at 250 rpm on a magnetic stir plate and the temperature and pH of the solution was monitored as in Example 1. The initial pH of the polymer solution was around 2.7 and this Example was carried out without the use of additional hard acid. The amount of glycerol (propane-1,2,3-triol) added to the mixture was 18.1 g. The glycerol was slowly added over 2 minutes by pipette to the polymer solution. No appreciable rise above room temperature was noted due to addition of glycerol. The final pH of Polymer A and glycerol solution was 2.7, as measured using a pH meter and Orion 9165BNWP Ag/AgCl pH probe.

During a single process to both dry and cure the samples, the solution was poured into open 9"×12" aluminum trays and put in a forced air oven at 200° C. for 2 hours. The mixture first rose to a temperature of around 100 to 110° C. where it boiled and evaporated excess moisture for about 1 hour, before the temperature then rose steadily to oven temperature at around 200° C. The material was removed from the oven and noted to be very dry, hard, and brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

Total SCA Release after 8 days aging at 66° C. was 62%, thus showing a very similar release rate as Example 1, which was identical to Example 4 with the exception of the additional hydrochloric acid.

Not to be bound by theory, it was concluded that the pH of the Polymer A, around 2.7, was sufficiently low and the corresponding protonation of the carboxylic acid groups was sufficiently high, to allow the esterification reaction to proceed with high conversion efficiency. The high degree of ester bond cross-linking then provided the basis for forming the large ground particles. The hydrolysis of these ester bonds in water was furthermore that mechanism by which a controlled release effect was demonstrated in a water-aged sample at 66° C.

TABLE 2

|  | Example 4 |
|---|---|
| Glycerol Cross-linker (XL) total amount [g] | 18.1 |
| SCA wt % - calculated in Final Solids | 85% |
| Total SCA release after 8 days (aged at 66° C.) | 62% |

Examples 5 to 11

Seven different cross-linked scale control agent particles were prepared and formulation details were summarized in the Table 3 below as Examples 5 to 11. To make these Examples, a 100-g sample of Polymer A on a dry-weight basis (232 grams of a 43 wt % aqueous solution) was selected as the polycarboxylate scale control agent (SCA) polymer. The polymer solution was stirred at 250 rpm on a magnetic stir plate and the temperature and pH of the solution was monitored as in Example 1. A 7.5-g quantity of 35 wt % hydrochloric acid was slowly added over 2 minutes by pipette to the polymer solution. A pH change from 2.8 to 2.0 for each solution was confirmed during the addition of acid.

Several cross-linking agents were selected from the classes of cross-linkers described as polyols or polyamines. These included 1,6-hexanediol, highly hydrolyzed polyvinyl alcohol (PVOH), a mixture of PVOH and glycerol, Diethylenetriamine (DETA), 1,6-hexadiamine, a mixture of DETA and PVOH, and a mixture of DETA and glycerol. The PVOH used was DuPont Elvanol 71-30 and this dry material was first dispersed in dilution water as noted in Table 3 and then heated to dissolve at 80° C. before it was slowly added by pipette to Polymer A solution. The amount of the cross-linkers used was summarized in Table 3. In Examples using an amine cross-linker, a temperature rise upon addition was observed from around room temperature to around 50° C. The final pH of the SCA polymer and cross-linker solutions was found to vary with cross-linker type. The final pH of the solutions containing polyamine cross-linkers was in the range 3.5 to 4. The final pH of the solutions containing polyol cross-linkers was around 2 to 2.5.

During the initial drying step, each the solution was poured into an open 9"×12" aluminum tray and placed in a forced-air oven at 60° C. to dry for 48 hours. After cooling to room temperature, the formulations were solid. During a subsequent curing step, the dried formulations were placed in a forced air oven set at 180° C. for 60 minutes. After cooling to room temperature, the formulations were solid and various shades of brown in color. The material was then placed in a blender and ground to form granules that were sifted through 20- and 40-US Std. mesh sieves. The 20 to 40 mesh sieve fraction provided particles primarily between 425 micron and 850 micron in diameter which were used in subsequent controlled release tests.

The controlled release rate measurement method, described for Example 1, was used to evaluate Examples 5 to 11. For each example, a 20-ml, 1.5-wt % solution was prepared using deionized water.

After aging at 66° C., the Total SCA Percent Release at Day 8 was determined for Examples 5 to 11 and were listed in Table 3 below. The release results varied for each cross-linker and demonstrated the ability to tune and control the amount of SCA polymer release, given here as the Total SCA % Release at 66° C. over 8 days. The lowest release values, 1%, 3%, and 4%, were obtained for Examples 8, 10, and 11, respectively, and these contained the DETA cross-linker. Higher release values, from 26% up to 40% were obtained using the polyol cross-linkers.

Not to be bound by theory, it was concluded that the release rate within a family of cross-linker types, such as polyols, could be controlled by both the cross-link density and also the relative hydrophobic and hydrophilic nature of selected cross-linker. For example, the 1,6-hexanediol cross-linkers could provide a slower release rate if used at a level to provide roughly the same amount of cross-linking as the more hydrophobic glycerol sample Example 1.

Also, not to be bound by theory, it was concluded that formation of amide cross-link bonds, allowed by the use of DETA and verified by TIR spectra, provided a much more stable bond for the purposes of controlled release. The mechanism for the release of SCA polymer was the hydrolysis of the amide bonds and this slower release values in water 66° C. relative to an ester bond hydrolysis mechanism.

TABLE 3

| | Example | | | | | | |
|---|---|---|---|---|---|---|---|
| | 5 | 6 | 7 | 8 | 9 | 10 | 11 |
| Cross-linker (XL) | 1,6-hexanediol | PVOH | PVOH + Glycerol | DETA | 1,6-hexane diamine | DETA + PVOH | DETA + Glycerol |
| XL Amount [g] | 34.5 | 25.7 | 12 g Glycerol 17 g PVOH | 20.1 | 17 | 13.4 g DETA 17 g PVOH | 13.4 g DETA 12 g Glycerol |

TABLE 3-continued

| | Example | | | | | | |
|---|---|---|---|---|---|---|---|
| | 5 | 6 | 7 | 8 | 9 | 10 | 11 |
| Dilution DI Water [g] | 0 | 130 | 88 | 0 | 0 | 88 | 0 |
| SCA wt %- calculated in Final Solids | 73% | 78% | 80% | 82% | 73% | 79% | 79% |
| Total SCA release after 8 days (aged at 66 C.) | 26% | 40% | 27% | 4% | 38% | 1% | 3% |

Examples 1 and 8 Aged in Synthetic Sea Water

The controlled release rate measurement method, described for Example 1, was carried out using synthetic sea water to evaluate the controlled release of Examples 1 and 8.

Synthetic sea water was prepared by dissolving "Sea-Salt", available from Lake Products Co. of Maryland Heights, Mo., by dissolving 41.95 grams "Sea-Salt" in deionized water with enough water added to make one liter total solution.

To prepare controlled release test samples, Examples 1 and 8 were both used to create 20-ml, 1.5-wt % solutions in both deionized water and synthetic sea water. After aging at 80° C., the Total SCA Percent Release at Day 8 was determined using the coacervation-turbidity technique described in Example 1.

For Example 1, the release was 74% in deionized water and 81% in sea water. For Example 8, the release was 1.7% in deionized water and 1.4% in sea water. These measurements demonstrated that the cross-linked scale control agent particles performed similarly in both deionized water and sea water.

Examples 12 to 14

Three different cross-linked scale control agent particles were prepared and the details of preparation were summarized in the Table 4 below as Examples 12 to 14. To make these examples, a 150-g sample of Polymer A on a dry-weight basis (351 grams of a 43 wt % aqueous solution) was selected as the polycarboxylate scale control agent (SCA) polymer. The polymer solution was stirred at 250 rpm on a magnetic stir plate and the temperature and pH of the solution was monitored as in Example 1. The initial pH of the polymer solution was around 2.7 and these Examples were carried out without the use of additional hard acid. The selected cross-linker was diethylenetriamine (DETA) and the amounts added were 30.1 g, 20.1 g, and 15.1 g for Examples 12, 13, and 14, respectively. The DETA was slowly added over 2 minutes by pipette to the polymer solution and a temperature rise upon addition was observed from room temperature to around 50° C. The final pH of Polymer A and cross-linker solutions was in the range 3.5 to 4. Each solution was poured into an open 9"×12" aluminum tray and put in a forced air oven at 200° C. for 2 hours. The mixture first rose to a temperature of around 100° C. to 110° C., where it boiled and evaporated excess moisture for about 1 hour, before the temperature then rose steadily to oven temperature at around 200° C. The material was removed from the oven and noted to have turned brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

To allow testing the controlled release amounts at temperatures above 100° C., the controlled release rate measurement method described for Example 1 was modified. A 20-ml, 1.5-wt % solution was prepared in glass vials using deionized water. The vials were enclosed in an Ofite Aging Cell (Model #175-25 available from OFI testing Equipment Inc. of Houston, Tex.) which can maintain steam pressures well in excess of 200° C. After aging the test solutions for 8 days at 150° C., the Total SCA Percent Release at Day 8 was determined.

Total SCA Release after 8 days aging at 150° C. was lowest, at 5%, for Example 12, which contained 83 wt % SCA. Total SCA Release after 8 days aging at 150° C. was highest, at 41%, for Example 14, which contained 91 wt % SCA. These examples represent the ability to control polymer release rates in for samples aged in water at 150° C.

TABLE 5

| | Example | | |
|---|---|---|---|
| | 12 | 13 | 14 |
| XL Amount [g] | 30.1 | 20.1 | 15.1 |
| SCA wt % - calculated in Final Solids | 83% | 88% | 91% |
| Total SCA release after 8 days (aged at 150° C.) | 5% | 18% | 41% |

Example 15

To make Example 15, a 100-g sample of Polymer A on a dry-weight basis (232 grams of a 43 wt % aqueous solution) was selected as the polycarboxylate scale control agent (SCA) polymer. The polymer solution was stirred at 250 rpm on a magnetic stir plate and the temperature and pH of the solution was monitored as in Example 1. A 7.5-g quantity of 35 wt % hydrochloric acid was slowly added over 2 minutes by pipette to the polymer solution. A pH change from 2.8 to 2.0 for each solution was confirmed during the addition of acid. A 10-g sample of DETA was slowly added over 2 minutes by pipette to the polymer solution and a temperature rise upon addition was observed from room temperature to around 50° C. The final pH of polymer, acid, and cross-linker solution was 3.7.

During the initial drying step, the mixture was poured into an open 9"×12" aluminum tray and put in a forced-air oven at 60° C. to dry for 48 hours. After cooling to room temperature, the formulation was solid. When 0.3 g of the substantially dried formulation was added to 15 g of deionized water, the material visibly dissolved at room temperature within 5 minutes. This was typical of normal dissolution of a dried water-soluble polymer and at this point demonstrated negligible controlled release characteristics.

During a subsequent curing step, the dried formulations were placed in a forced air oven set at 180° C. for 50 minutes. The materials were then removed and were noted to be brown in color. The weight percent of scale control agent on a solids basis in Example 15 was calculated to be 89 wt % SCA. The material was then placed in a blender (available from Blendtec in Orem, Utah) and ground to form granules that were sifted through a 20- and 40-US Std. mesh sieves. The 20 to 40 mesh sieve fraction provided particles primarily between 425 micron and 850 micron in diameter which were used in subsequent controlled release tests.

For Example 15, a modified controlled release test procedure was used to evaluate ongoing controlled release rate under anaerobic conditions at 150° C. A 200-g solution containing 5.0 g of Example 15 (i.e. 2.5-wt % of particle in water) was prepared in a glass jar and enclosed in an Ofite Aging Cell and pressurized under a pressure of 100 psi nitrogen. The sample was aged under these conditions for a series of times including 1, 3, 7, 14, 30, 60, 90, and 190 days. At the completion of each successive aging time, the sample was cooled to RT, depressurized, and the aqueous solution of released polymer was decanted and stored in a sealed glass jar at 35° C. for testing at a later date. After removal of each aged supernatant, the remaining cross-linked polymer granules were rinsed twice and the rinse supernatant was removed. Finally the solution was replenished to a 200-g total weight using deionized water and the sample was subjected to further testing.

The data collected from these tests was shown in Table 6 and demonstrated that controlled release from Example 15 continued in a controlled and measurable manner for over 9 months at 150° C. It was noted that in the first hour of testing, approximately 3.8% of the polymer was released that was likely due to polymer that was not cross-linked or only lightly cross-linked. The total released polymer in each test solution was determined and was reported in Table 6. The release rate per day was further calculated and was found to decrease gradually from a maximum of 11% per day (on day 1) to an average of 0.0% per day from day 60 to day 296. The actual concentrations of each resulting aqueous solution (both the total polymer amount in ppm and also the calculated daily amount) were also shown in Table 6. These polymer amounts indicated how a user could choose the appropriate initial amount of controlled release SCA polymer to ensure the desired amount of scale control benefit released into solution would be at the desired level and time for a given application. Typically, scale control benefits are provided by scale control polymers to a minimum of 2 to 50 ppm depending on the hard water conditions.

TABLE 6

| Aging Period | % Release over Aging Period | Average % Daily Release | Total Release over Aging Period ppm | Average Daily Release ppm |
|---|---|---|---|---|
| Hour 1 to Day 1 | 11.1 | 11.1 | 4891 | 4891.0 |
| Day 1 to 3 | 2.9 | 1.4 | 1263 | 631.5 |
| Day 3 to 7 | 1.7 | 0.42 | 741 | 185.2 |
| Day 7-14 | 1.2 | 0.17 | 525 | 75.0 |
| Day 14-29 | 1.2 | 0.08 | 514 | 34.3 |
| Day 29-59 | 0.8 | 0.027 | 354 | 11.8 |
| Day 59-89 | 0.5 | 0.012 | 214 | 5.3 |

TABLE 6-continued

| Aging Period | % Release over Aging Period | Average % Daily Release | Total Release over Aging Period ppm | Average Daily Release ppm |
|---|---|---|---|---|
| Day 89-190 | 1.7 | 0.017 | 760 | 7.6 |
| Day 190-296 | 9.5 | 0.09 | 4176 | 39.4 |

In order to verify that the scale control agent polymer released in the above experiments perform in a similar way to the original Polymer A, some of stored aqueous released polymer solutions were tested in a dynamic tube blocking inhibition test apparatus. This apparatus consisted of a 1-meter loop of 1-mm ID stainless steel capillary tubing coiled and placed in an oven at 80° C. The coil was equipped with pressure gauges at the both ends of the tubing. The released polymer solutions from the aging of Example 15 was then added at varying concentrations to a 1200-ppm bicarbonate solution, made from anhydrous sodium bicarbonate. The polymer solutions from Table 6 where added to the bicarbonate solutions, so that with equal additions of both bicarbonate and calcium solutions at a total flow rate of 3 ml/min, the final concentrations of polymer dissolved was 10, 7.5, 5, and 2.5 ppm. Each sample solution pair was run through the capillary for 30 minutes. If no pressure rise across the two pressure gauges was seen, then the polymer was confirmed as effective at this concentration and the next lower concentration was examined, again for 30 minutes. Finally, the Minimum Inhibitor Concentration, MIC, specific to this test, was taken as the lowest polymer addition level that kept the tube from blocking and thus prevented any substantial increase in pressure in the capillary tube. In Table 7 below, the results of the dynamic tube blocking inhibition test were summarized for aqueous released polymer solutions collected from Examples 12 and 14. In control tests, it was noted that when no polymer is used, the capillary pressure rises rapidly within the first 30 minute test. Furthermore, when a control test was carried out using fresh Polymer A there was no differential pressure rise down to and including 5 ppm. Thus the MIC for Polymer A Control was 5 ppm. All of the released polymer solutions from Examples 12 and 14 exhibited MIC values of 5 or 10 ppm. This demonstrated the effectiveness of the polymers released from the cross-linked scale control agent particles of these examples.

TABLE 7

Minimum Inhibitor Concentration (MIC) of released polymer solutions

| Aging Condition of Sample for Dynamic Loop Test | Example 12 MIC [ppm] | Example 14 MIC [ppm] |
|---|---|---|
| Polymer A Control | 5 | |
| 1 hr | 5 | 5 |
| 1 day | 10 | 10 |
| 4 day | 5 | 10 |
| 7 day | 10 | 10 |
| 14 day | 5 | 10 |

Examples 16 to 17

Two batches of cross-linked scale control agent sample were prepared and the details of preparation were summarized in the Table 8 below as Examples 16 and 17. To make these examples, a 1000-g sample of Polymer A, on a dry-weight basis (2392 grams of a 43 wt % aqueous solution) was selected as the polycarboxylate scale control agent (SCA) polymer. The polymer solution was stirred using a Heidolph RZR 2020 overhead mixer fitted with a 2¾" flat paddle mixing blade from Cole Parmer Inc. The initial pH of the polymer solution was around 2.7 and these Examples were carried out without the use of additional hard acid. A 200 g aliquot of diethylenetriamine (DETA) was slowly added over 5 minutes to the polymer solution. Slow addition maintained the temperature of the formulation to less than 60° C. and the final pH of the mixture was 4.6. The SCA wt % of the final mixture was calculated to be 83%.

To dry and partially cross-link this material, the mixtures were pumped via a peristaltic pump at a feed rate of 120 ml/min to a Bowen #1 Tower Spray Dryer available from Niro Inc. of Columbia, Md. The inlet temperature was adjusted to reach an outlet temperature of 173° C. for Example 16 and an outlet temperature of 223° C. for Example 17. Example 17 was noted to be darker in color than Example 16 and both spray dried powders were finer than 425 microns and passed through a 40 US Std. mesh sieve.

In order to assure a complete post-cure of Example 16 and 17, a 200 g of each spray dried mixture was spread in 9"×12" aluminum pans and further temperature subjected to 200° C. for 1 hour.

For Examples 16 and 17, the Total SCA Release after 8 days aging at 150° C. was measured both before and after the samples were subjected to the additional 200° C. for 1 hour. The coacervation-turbidity method described in Example 12 was used to obtain the results shown in Table 8.

For samples not subjected to the extra curing conditions, the Total SCA Release after 8 days aging at 150° C. decreased sharply with spray drier outlet temperature. For Example 16, where the mixture was subjected to spray drying with an outlet temperature of 173° C., the measured SCA release was 39%. For example 17, where the spray dry outlet temperature was 223° C., the measured SCA release was 16%. This indicated that appreciable cross-linking had taken place within the spray dryer. Also, the higher spray dryer outlet temperature resulted in significantly less release and thus a great degree of cross-linking.

For both Examples further subjected to a temperature of 200° C. for 1 hr, the Total SCA Release after 8 days aging at 150° C. was reduced to 5% to 6%.

TABLE 8

| | Example | |
|---|---|---|
| | 16 | 17 |
| Spray Dry Temperature | 173° C. | 223° C. |
| Total SCA Release at 8 day from Release Test at 150° C. for Spray Dry Mixture | 39% | 11% |
| Total SCA Release at 8 day from Release Test at 150° C. for Spray Dried Mixture Subjected to additional Temperature of 200° C. for 1 hour. | 6% | 5% |

Examples 18, 19, and 18B

Two 20 g samples of the spray dried powders from Examples 16 and 17 were selected for additional process steps including compaction, sizing, and post-curing. The original spray dried material (not the additional temperature subject material) was used. This resulted in Examples 18 and 19 shown in Table 9 below.

The sample was loaded 0.5 g at a time into a MTCM-1 manual tablet compaction press available from GlobePharma Inc. of North Brunswick, N.J. that was fitted with a Natoli 04-05 punch set and Natoli 10/98 ½" die set. Each separate 0.5 g sample was compacted to 4000 psi for 2 seconds to form tablets. After 20 g of tablets were collected, the material was then placed in a blender and ground to form particles that were sifted through 20- and 40-US-Std. mesh sieves. The sized particles were then further temperature subjected to 200° C. for 1 hour. The materials were noted to have developed a darker brown color.

The controlled release rate measurement method, described for Example 12, was used to evaluate Examples 18 and 19, which were described as compacted, sized, and 200° C. temperature subjected particles.

Total SCA Release values after 8 days aging at 150° C. were summarized for Examples 18 and 19 and were 10% and 12%, respectively. These results were summarized in Table 9 below and indicated that that process steps of compaction, sizing, and further subjecting the resulting particles to 200° C. for 1 hour was very effective in creating particles with consistent and low Total SCA Release values.

To create a large sample and demonstrate ability to carry out large scale manufacture of Example 18, multiple replicated spray dried powder samples from Example 16 were collected into a 5.4 kg sample. This powder sample was then roller compacted using an IR-520 Chilsonator (available from Fitzpatrick Company in Elmhurst, Ill.). The compaction pressure was set to be approximately the compaction pressure used for Example 18. The compacted material was milled and sieved to 20 to 40 US mesh. The roller compacted particles were then subjected to 200° C. for 1 hour. This Example was called Example 18B. The modified controlled release rate measurement method, described for Example 15, was used to evaluate the controlled release of Example 18B in water over a period of 365 days at 150° C. This method used the Ofite Aging Cell. A 5 g sample of Example 18B combined with 195 g deionized water to create a 200 g total test sample. This was placed in the Ofite cell under anerobic conditions for successively longer periods of time. After each test period, the release polymer solution was removed and the particle testing continued with fresh water. The results are summarized in Table 9B. The data collected from these tests demonstrated that controlled release from Example 18B continued in a controlled and measurable manner for 1 year at 150° C. Particles remained after 1 year at 150° C. and implied release extended beyond 1 year. Release measurements were therefore continued into the 2$^{nd}$ year.

The bulk density of Examples 18 and 19 were measured by filling equivalent weights of each material in a graduated cylinder, hand tapping, and then measuring the highest graduated cylinder line covered by the particle bed. The bulk densities were summarized in Table 9. The original spray dried powders had bulk densities of 0.18 and 0.09 g/ml for Examples 16 and 17, respectively. In contrast, the bulk density for Examples 18 and 19 were found to be 0.56 and 0.23 g/ml, respectively.

The compressibility of dry particles was measured using a Texture analyzer equipped with a 25-kg load cell and 7-mm diameter flat-tipped stainless steel compression rod (Model TA-TX2i Texture Analyzer obtained from Texture Technologies Corporation of Scarsdale, N.Y.). The compression rod was adjusted to the top of a lightly packed bed of particles from Examples 12, 18, and 19. Samples in this set all contained 83 wt % Polymer A with DETA cross-linker. Example 12 was seen to be fairly incompressible at all load levels and exhibit fracturing behavior at load levels of about less than 10 Newtons, corresponding to pressures of about 0.25 MPa on the particle bed. These Example 12 particles behaved as a brittle solid with a low compressibility of around 1% to less than about 5% followed by fracturing. Examples 18 to 19 behaved as compressible particles with the compression of the particle bed continuing up to the limit of the load cell of about 300 Newtons, corresponding to about 10 MPa on the particle bed. The maximum compression, taken as a 1 minus the ratio of the final particle bed height to the initial bed height at the 300 Newton load cell limit (about 10 MPa bed pressure), was 30% for Example 18 and 65% for Example 19. Example 12 showed little if any compressibility at these levels and fracturing behavior. Microscope analysis of Examples 18 and 19 showed the particles were slightly deformed in compression but remained whole and intact. It was assumed that the compression of the bed of particles, though unidirectional from the load cell and rod, distributed the load across the bed and therefore had similarities to the distribution of loads in a sand pack as might be found in an oilfield fracture zone.

Compression tests were also performed using a fixed 50 Newton load applied in a unidirectional manner on individual particles. In this test, the initial load on a round particle could be estimated as load divided by the initial contact area of the rounded particle, for particles from Examples 18 and 19, these initial loads were in excess of 1000 MPa. The particles of Examples 18 and 19 under these conditions were compressed to flatter particles with diameters of around 1000 to 2000 microns, whereby the pressure was reduced to around 100 MPa, and particles where observed to crack and flatten without the generation of excess fine particles (also called fines) with estimated compression of particle thickness of up to 90%. Under similar test conditions, the particles of Example 12 break into fines.

TABLE 9

|  | Example | |
| --- | --- | --- |
|  | 18 | 19 |
| Spray Dry Sample used for compaction, sizing, and temperature subjecting steps | 16 | 17 |
| Total SCA Release at 8 day from Release Test at 150° C. | 12% | 10% |
| Compacted Particle Bulk Density g/ml | 0.56 | 0.23 |
| Compressibility of 10 mm particle bed under 0.25 MPa | 3% | 25% |
| Compressibility of 10 mm particle bed under 2 MPa | 10% | 45% |
| Compressibility of 10 mm particle bed under 10 MPa | 30% | 75% |
| Compressibility of individual particles under pressures from around 100 to around 1000 MPa. | Around 30% to 75% | Around 75% to 90% |

TABLE 9B

Release Data for Example 18B

| Aging Period | % Release over Aging Period | Average % Daily Release | Total Release over Aging Period ppm | Average Daily Release ppm |
| --- | --- | --- | --- | --- |
| Hour 1 to Day 1 | 2.9 | 2.9 | 608 | 608 |
| Day 1 to 4 | 3.0 | 1.0 | 633 | 211 |
| Day 3 to 8 | 2.2 | 0.44 | 462 | 92 |
| Day 8 to 15 | 1.25 | 0.18 | 260 | 37 |
| Day 15 to 28 | 0.62 | 0.05 | 128 | 9.9 |

TABLE 9B-continued

Release Data for Example 18B

| Aging Period | % Release over Aging Period | Average % Daily Release | Total Release over Aging Period ppm | Average Daily Release ppm |
| --- | --- | --- | --- | --- |
| Day 28 to 56 | 0.60 | 0.021 | 125 | 4.5 |
| Day 56 to 110 | 0.67 | 0.012 | 140 | 2.6 |
| Day 110 to 180 | 1.41 | 0.020 | 293 | 4.2 |
| Day 180 to 365 | 7.2 | 0.04 | 1494 | 8.1 |

Example 20

A sample of the spray dried powder from Examples 16 was selected for additional process steps including mixing with barium sulfate, compaction, sizing, and further subjecting the resulting particles to 200° C. for 1 hour. This resulted in Example 20.

A 95 g sample of Example 16 was mixed by hand with a 5 g sample of barium sulfate ($BaSO_4$, available from Sigma-Aldrich of Englewood, N.J.). The resulting mixture was loaded 0.5 g at a time and compressed into ½" diameter tablets using the same process as in Example 18. After 20 g of tablets were collected, the material was then placed in a blender and ground to form particles that were sifted through 20- and 40-US-Std. mesh sieves. The sized particles were then further temperature subjected to 200° C. for 1 hour. The materials were noted to have developed a darker brown color. Accounting for the $BaSO_4$, the SCA wt % in Example 20 was calculated to be 79%.

The final scale control agent polymer release at 8 day for Example 20 was measured to be 7%. This was measured using the same method as used for Example 18, which is the corresponding compressed particle obtained from Example 16. The results showed that addition of $BaSO_4$ did not appreciably change the controlled release rate from that obtained for Example 18.

Not to be bound by theory, the specific gravity of a particle can be used to adjust the buoyancy of a particle when they are suspended in liquids. For examples 18 and 20, the specific gravity was measured by submerging a known weight of the particles in water. Typically, any liquid which wets the particles can be used for this purpose and since these particles were fairly insoluble at room temperature, water was used in this case. The specific gravity of the Example 18 was found to be 1.38 relative to water. The specific gravity of Example 20 was found to be 1.8. These Examples and measurements exemplified that the specific gravity of these particles could be increased by the addition of $BaSO_4$, which for which the specific gravity was 4.5. Furthermore, compression tests as carried out for Example 18, demonstrated similar toughness and compressibility for Example 20.

Examples 21 to 23

Three different cross-linked scale control agent particles were prepared and the details of preparation were summarized in the Table 10 below as Examples 21 to 23. To make these examples, a 50-g sample of Polymer A on a dry-weight basis (117 grams of a 43 wt % aqueous solution) was selected as the polycarboxylate scale control agent (SCA) polymer. The polymer solution was stirred at 250 rpm on a magnetic stir plate and the temperature and pH of the solution was monitored as in Example 1. The initial pH of the polymer solution was around 2.7. For each Example shown in Table 10, different polyamines were first premixed and then added to the SCA polymer slowly while mixing.

For Example 21, the polyamine mixture consisted of 9.4 g DETA, 0.5 g Lupasol PR8515 polyethyleneimine, and 0.1 g Lupamin 9095 polyvinyl amine, available from BASF.

For Example 22, the polyamine mixture consisted of 10 g DETA and 5 g of Duomeen C coco propylenediamine, available from AkzoNobel Surface Chemistry LLC of Chicago, Ill.

For Example 23, the polyamine mixture consisted of 10 g DETA and 5 g of Triameen YT, tallow dipropylene triamine, available from AkzoNobel Surface Chemistry LLC of Chicago, Ill.

The final pH of Polymer A and cross-linker solutions was in the range 3.5 to 4. The solutions were poured into open 5"×7" aluminum trays and put in a forced air oven at 200° C. for 2 hours for drying and curing. The material was removed from the oven and noted to have turned hard and brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

The Total SCA Release after 8 days aging at 150° C. was measured using the same method as used for Example 12. Total SCA Release after 8 days aging at 150° C. was 8% for Example 21, 3% for Example 22, and 4% for Example 23. These low rates of release at 150° C. exemplified that the use of these mixed polyamine cross-linker mixtures provided good controlled release.

The polymeric additives of Example 21 were used to impart different and, for certain applications, improved physical properties to the particles which can in part be achieved by addition of both medium and high molecular weight polymers.

Duomeen C and Triameen YT were used in Examples 22 and 23, respectively, so that the cross-linker material co-released with the SCA polymer could also provide beneficial properties to the oilfield application. These materials are known to provide metal corrosion inhibition benefits.

TABLE 10

| | Example | | |
|---|---|---|---|
| | 21 | 22 | 23 |
| Cross-linkers and Amounts [g] | DETA - 9.4 g Lupasol PR8515 - 0.5 g Lupamin 9095 - 0.1 g | DETA - 10 g Duomeen C - 5 g | DETA - 10 g Triameen YT - 5 g |
| SCA wt % - calculated in Final Solids | 83% | 77% | 77% |
| Total SCA release after 8 days (aged at 150° C.) | 8% | 3% | 4% |

Examples 24 to 26

Three different cross-linked scale control agent particles were prepared and the details of preparation are summarized in the Table 11 below as Examples 24 to 26. To make these examples, three different SCA polymers were used to exemplify the controlled release of a variety polymeric materials.

For Example 24, a 50-g sample of Alcosperse 602, a 4500 molecular weight polyacrylic acid obtained from AkzoNobel Surface Chemistry LLC of Chicago, Ill., on a dry-weight basis (111.6 grams of a 45 wt % aqueous solution) was selected as the polycarboxylate scale control agent (SCA) polymer.

For Example 25, a 50-g sample of Polymer B on a dry-weight basis (128.9 grams of a 39 wt % aqueous solution) was selected as the polycarboxylate scale control agent (SCA) polymer.

Preparation of Polymer B: An initial charge consisting of 500 grams of water, 629 grams of maleic anhydride, 17.4 grams of sodium methaallyl sulfonate and 226.5 grams of sodium hydroxide (50% solution) to partially neutralize the maleic acid was added to a reactor and the temperature was raised to 95-98 C. An initiator solution containing 478 grams of 35% hydrogen peroxide was added over 6 hours. The reaction mixture was held at 95 to 98 C for an additional 2 hours.

For Example 26, a 50-g sample of Polymer C on a dry-weight basis (123.8 grams of a 40 wt % aqueous solution) was selected as the polycarboxylate scale control agent (SCA) polymer.

Preparation of Polymer C: An initial charge consisting of 400 grams of water and 40 grams of sodium hypophosphite hydrate was added to a reactor and the temperature was raised to 75 C. A monomer feed consisting of 442 grams of acrylic acid was added to the rector over 3 hours. An initiator solution containing 11 grams of sodium persulfate dissolved in 80 grams of water was added over 3.5 hours. The reaction mixture was held at 75 C for an additional 60 minutes. The final product was cooled and partially neutralized with 80 grams of 50% sodium hydroxide solution.

For each Example, the polymer solution was stirred at 250 rpm on a magnetic stir plate and the temperature and pH of the solution was monitored as in Example 1. The initial pH of the polymer solutions were in the range 2 to 3. For each Example, a 10 g sample of DETA was slowly added over 2 minutes and the final solution pH values were 4.1 for Example 24, 5.1 for Example 25, and 5.2 for Example 26.

The solutions were each poured into open 5"×7" aluminum trays and put in a forced air oven at 200° C. for 2 hours for drying and curing. The material was sized as in Example 21 to provide particles primarily between 425 microns and 850 microns in diameter which were used in subsequent controlled release tests. Each Example contained 83 wt % of the scale control polymer.

The Total SCA Release after 8 days aging at 66° C. was measured using the a method similar to that used for Example 1. In this case, the coacervation-turbidity method was calibrated for each different polymer used. Total SCA Release after 8 days aging at 66° C. was 18% for Example 24, 36% for Example 25, and 2% for Example 26. These different release amounts after 8 days at 66° C. exemplified that different scale control polymers could be cross-linked and formed into controlled release particles using this method.

TABLE 11

| | Example | | |
|---|---|---|---|
| | 24 | 25 | 26 |
| SCA | Alcosperse 602A | Polymer B | Polymer C |
| pH of final mixture | 4.1 | 5.1 | 5.2 |
| Total SCA release after 8 days (aged at 66° C.) | 18% | 36% | 2% |

Examples 27 to 29

Three different cross-linked scale control agent particles were prepared and the details of preparation are summarized in the Table 12 below as Examples 27 to 29. To make these examples, three different scale control agents were used to exemplify the controlled release of a variety of materials. In addition, a different cross-linker was used to further exemplify the ability of the cross-linker to affect the controlled release rate.

For Example 27, a 50-g sample of Polymer A on a dry-weight basis (117 grams of a 43 wt % aqueous solution) was selected as the polycarboxylate scale control agent (SCA) polymer.

For Example 28, a 50-g sample of diethylenetriamine penta(methylene phosphonic acid) (DTPMP) on a dry-weight basis (100 grams of a 50 wt % aqueous DTPMP solution containing 25 wt % HCl) was selected as the polyphosphonate scale control agent (SCA). DTPMP was obtained from Sigma-Aldrich of Englewood, N.J.

For Example 29, a 50-g sample of anhydrous citric acid was selected as the polycarboxylate scale control agent and dissolved in water as a 40 wt % solution.

For each Example 27 to 29, the SCA solution was stirred at 250 rpm on a magnetic stir plate and the temperature and pH of the solution was monitored as in Example 1.

For Example 27, a 10 g sample of pentaerythritol was dissolved in water at 50 C to create a 5 wt % solution. For Examples 28 and 29, a 15 g sample of pentaerythritol was dissolved in water at 50 C to create a 5 wt % solution. This warm solution was slowly added over 2 minutes to the scale control agent solutions and the initial and final solution pH values were all less than 2.7.

The solutions were each poured into open 5"×7" aluminum trays and put in a forced air oven at 200° C. for 2 hours for drying and curing. The material was sized as in Example 21 to provide particles primarily between 425 microns and 850 microns in diameter which were used in subsequent controlled release tests. The SCA wt % content was listed Table 12.

The Total SCA Release after 8 days aging at 66° C. was measured using the a method similar to that used for Example 1, where the coacervation-turbidity meter was calibrated for each different scale control agent used. Total SCA Release after 8 days aging at 66° C. was 18% for Example 27 and 36% for Example 28. For example 29, a visual observation of controlled release was made by noting the amount of undissolved material and estimating the release. After 8 days at 66 C, about 50% of the material had dissolved.

These different release amounts after 8 days at 66° C. exemplified that different scale control agents, including small molecule containing carboxylic acid moieties and phosphonic acid moieties, could be cross-linked and formed into controlled release particles using this method.

In addition, the much lower Total SCA Release after 8 days at 66 C of Example 27 relative to Example 1 indicated that the pentaerythritol cross-linker was able to produce a particle with slower release kinetics, when tested under similar aging conditions.

TABLE 12

| | Example | | |
|---|---|---|---|
| | 27 | 28 | 29 |
| Scale control agent | Polymer A | DTPMP | Citric Acid |
| SCA wt % - calculated in Final Solids | 83% | 77% | 77% |

TABLE 12-continued

| | Example | | |
|---|---|---|---|
| | 27 | 28 | 29 |
| Total SCA release after 8 days (aged at 66° C.) | 6% | 35% | 50% |

Example 30

A multi-functional cross-linked controlled release particle consisting of a scale control agent and a corrosion inhibitor was prepared as described below. To make this example, a 25-g sample of Polymer A on a dry-weight basis (58 grams of a 43 wt % aqueous solution) was selected as the polycarboxylate scale control agent (SCA) polymer. The molecule Armeen C (coco amine available from AkzoNobel Surface Chemistry LLC of Chicago, Ill.) was chosen as the corrosion agent to be attached, via capping, to the polymer. Diethylenetriamine (DETA) was chosen as the cross-linker.

Polymer A was stirred at 250 rpm on a magnetic stir plate. The initial pH of the polymer solution was around 2.7. A pre-mix of cross-linker (DETA) and capping agent (Armeen C) was prepared using 5 g DETA and 2.5 g Armeen C. The premix was added to the SCA polymer slowly while mixing. After mixing all ingredients, the solution was poured into an open 5"×7" aluminum pan and put in a forced air oven at 200° C. for 2 hours for drying and curing. The material was removed from the oven and noted to have turned hard and dark brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

The final composition contained 77 wt % SCA and 8 wt % Corrosion Inhibitor. The Total SCA Release and Total Corrosion Inhibitor Release is measured after 8 days aging at 150° C. Total Corrosion Inhibitor Release is measured via analytical techniques such as liquid or gas phase chromatography. In order to verify that the corrosion inhibitor agent released in the above experiments performs in a similar way to the original Armeen C, corrosion inhibitor effectiveness is measured via standard metal coupon corrosion or electrochemical cell testing protocols. In order to verify that the scale control agent polymer released in the above experiments performs in a similar way to the original Polymer A, some of stored aqueous released polymer solutions is tested in a dynamic tube blocking inhibition test apparatus.

Example 31

A multi-functional cross-linked controlled release particle consisting of a scale control agent and a acidizing agent was prepared as described below. To make this example, a 40-g sample of Polymer A on a dry-weight basis (94 grams of a 43 wt % aqueous solution) was selected as the polycarboxylate scale control agent (SCA) polymer. The molecule lactic acid (available from Sigma-Aldrich of Englewood, N.J.) was chosen as the acidizing agent to be attached, as an extension agent, to the polymer. Pentaerythritol (available from Sigma-Aldrich of Englewood, N.J.) was chosen as the cross-linker.

Polymer A was stirred at 250 rpm on a magnetic stir plate. The initial pH of the polymer solution was around 2.7. Into this solution, 20 g of lactic acid and then 12 g of pentaerythritol were slowly added to the SCA polymer while mixing. After mixing all ingredients, the solution was poured into an open 5"×7" aluminum pan and put in a forced air oven at 200° C. for 2 hours for drying and curing. The material was removed from the oven and noted to have turned hard and light brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

The final composition contained 56 wt % SCA and 28 wt % acidizing agent. The Total SCA Release and effect of the corrosion inhibitor is measured after 8 days aging at 66° C. The release of the acidizing agent is measured via analytical techniques such pH titration. Performance of the released acidizing agent can be confirmed in the ability of the solution to dissolve acid-soluble minerals such as limestone, or other carbonate containing materials. In order to verify that the scale control agent polymer released in the above experiments performs in a similar way to the original Polymer A, some of stored aqueous released polymer solutions is tested in a dynamic tube blocking inhibition test apparatus.

Example 32

A multi-functional cross-linked controlled release particle consisting of a scale control agent and a acidizing agent was prepared as described below. To make this example, a 20-g sample of Polymer A on a dry-weight basis (47 grams of a 43 wt % aqueous solution) was selected as the polycarboxylate scale control agent (SCA) polymer. The molecule lactic acid (available from Sigma-Aldrich of Englewood, N.J.) was chosen as the acidizing agent to be attached, as an extension agent, to the polymer. Pentaerythritol (available from Sigma-Aldrich of Englewood, N.J.) was chosen as the cross-linker.

Polymer A was stirred at 250 rpm on a magnetic stir plate. The initial pH of the polymer solution was around 2.7. Into this solution, 40 g of lactic acid and then 12 g of pentaerythritol were slowly added to the SCA polymer while mixing. After mixing all ingredients, the solution was poured into an open 5"×7" aluminum pan and put in a forced air oven at 200° C. for 2 hours for drying and curing. The material was removed from the oven and noted to have turned hard and light brown in color. The material was then placed in a blender and ground to form granules that were sifted through 20- and 40-US-Std. mesh sieves. The 20 to 40 mesh sieve fraction provided particles primarily between 425 microns and 850 microns in diameter which were used in subsequent controlled release tests.

The final composition contained 28 wt % SCA and 56 wt % acidizing agent. The Total SCA Release and effect of the corrosion inhibitor is measured after 8 days aging at 66° C. The release of the acidizing agent is measured via analytical techniques such pH titration. Performance of the released acidizing agent can be confirmed in the ability of the solution to dissolve acid-soluble minerals such as limestone, or other carbonate containing materials. In order to verify that the scale control agent polymer released in the above experiments performs in a similar way to the original Polymer A, some of stored aqueous released polymer solutions is tested in a dynamic tube blocking inhibition test apparatus.

Example 33

A cross-linked controlled release particle consisting of a scale control agent and a cross-linker which were mixed, imbibed into a porous substrate, and then cross-linked as described below. To make this example, a 15-g sample of Polymer A on a dry-weight basis (37 grams of a 41 wt % aqueous solution) was selected as the polycarboxylate scale control agent (SCA) polymer. Glycerol (available from Sigma-Aldrich of Englewood, N.J.) was chosen as the cross-linker.

Polymer A was stirred at 250 rpm on a. magnetic stir plate. The initial pH of the polymer solution was around 2.7. Into this solution, 2.7 g of glycerol was slowly added to the SCA polymer while mixing. After mixing, 15 g of this solution was added to a metal dish containing 5 g of Celatom MP-78 Aggregate sintered diatomaceous earth granules (available from EP Minerals, Reno, Nev.). These granules or particles had a size of around 225 microns to 1700 microns. This material had water absorption specification of 130%, which was calculated to be about 55% pore volume. The solution and granules are placed in a vacuum oven and evacuated to allow the material to enter the porous cavities of the granule. The material was then filtered in a 100 ml Buechner funnel and lightly rinsed to remove excess surface polymer. The polymer-solution filled granule was dried for 2 hours at 100 C to remove excess moisture. The dry polymer-filled granule was then post-cured at 200 C for 1 hour to cross-link the material Within and around the granule.

The final loading of the imbibed and cross-linked controlled release scale control agent was calculated by gravimetrics and found to be 18.5 wt %. Total SCA Release was measured after 1 day aging at 66° C. This data is compared to release of material from a control sample, denoted as Example 33-Control, which was dried but not cross-linked Total SCA Release from Example 33-Control and Example 33 were measured after 1 day aging at 66° C. The control sample was completely released (100%), whereas cross-linked Example 33 released only 14% of available SCA. This demonstrated the controlled-release benefits when the material was impregnated into a porous insoluble inorganic materials.

| | Example | |
| --- | --- | --- |
| | 33-Control | 33 |
| SCA wt % - calculated in Final Solids | 15% | 15% |
| Total SCA release after 1 day (aged at 66° C.) | 100% | 14% |

Overall, the active 15 wt % SCA loading of this particle was much less than the 83-93 wt % loading of Examples 1 to 3. The particle was examined for physical strength and was found to take on the physical strength of the porous sintered diatomaceous earth particle. In this case, the particles were found to be fairly friable and were turned into a fine powder by rubbing the particles between one's fingers under moderate pressure. Different physical strength properties were explored by choosing a different solid particle. One such particle was Carbo Econoprop porous 30-50 mesh proppant (available from Carbo Ceramics Inc., Houston, Tex.). This material was observed to be much stronger and less friable and its strength was documented in the manufacturers specifications. However, when this particle was loaded with the SCA and cross-linker solution, rinsed, dried, and cured, it was found that a minimal amount of SCA was finally imbibed in the proppant. The loading was estimated to be just 1-5 wt %. This loading was again much smaller than the 83-93 wt % loading of Examples 1 to 3, but again provided a porous proppant with a cross-linked SCA for controlled release. To use either of these particles containing a porous particle and a cross-linked controlled release scale inhibitor in an application, the required amount would simply be scaled by the relative loading of the particle. Other porous materials are known to those skilled in the art and include a variety of porous alumina ceramics and natural fibrous materials, such as corn-cob fiber. The porosity can be adjusted by use of appropriate fillers and sintering conditions.

Example 34

A multi-functional cross-linked controlled release particle consisting of a scale control agent and a paraffin inhibitor was prepared as described below. To make this example, a 2.5-g sample of Polymer A on a dry-weight basis (6.1 grams of a 41 wt % aqueous solution) was selected as the polycarboxylate scale control agent (SCA) polymer. The copolymer ester Armohib PC-105 (available from AkzoNobel Surface Chemistry LLC of Chicago, Ill., and listed as "alkenes, c20-24 .alpha.-, polymers with maleic anhydride, c20-28-alkyl esters").) was chosen as the paraffin crystal inhibitor to be cross-linked together with diethylenetriamine (DETA) as the cross-linker.

Polymer A was stirred at 250 rpm on a magnetic stir plate. A premix of 1 g DETA cross-linker and 2.5 g PC-105 paraffin inhibitor polymer (3.1 g of a 80 wt % polymer and solvent mixture) was prepared and then added to the stirring Polymer A solution which formed a homogenous solution. After mixing, the solution was poured into an open 5"×7" aluminum pan and put in a forced air oven at 200° C. for 2 hours for drying and curing. The material was removed from the oven and the color and physical properties were noted. The material was placed in a blender and ground to form granules that are sifted through 20- and 40-US-Std. mesh sieves.

The final composition can be varied to give optimal physical and performance characteristics. The material is placed in a test liquid and release is ascertained after 8 days at 150 C. Paraffin inhibition performance is measured through a pour-point test method, in which a known quantity of the released material is added to the pour-point test mixture and pour-point temperature is ascertained.

Example 35

A cross-linked controlled release particle consisting of a paraffin inhibitor was prepared as described below. To make this example, a 5-g sample of Armohib PC-105 was selected at the organic-crystal inhibition polymer (6.2 g of a 80 wt % polymer and solvent mixture). The copolymer ester Armohib PC-105 was available from AkzoNobel Surface Chemistry LLC of Chicago, Ill., and listed as "alkenes, c20-24 .alpha.-, polymers with maleic anhydride, c20-28-alkyl esters").

A 1 g sample of DETA cross-linker was mixed homogenously into the paraffin inhibitor polymer (Armohib PC-105) The solution was poured into an open 5"×7" aluminum pan and put in a forced air oven at 200° C. for 2 hours for drying and curing. The material was removed from the oven and the color and physical properties were noted.

The final material was soft in its physical form and thus particle formation can be done using wet dispersing technology. Alternatively, the material from this example is coated onto a substrate, such as Celatom MP-78 Aggregate sintered diatomaceous earth granules, as in Example 33, prior to cross-linking in order to provide for harder final particles.

The final composition can be varied to give optimal physical and performance characteristics. The material is placed, in a test liquid and release is ascertained after 8 days at 150 C. Paraffin inhibition performance is measured through a pour-point test method, in which a known quantity of the released material is added to the pour-point test mixture and pour-point temperature is ascertained.

We claim:

1. A cross-linked scale control agent particle comprising:
   a scale control agent selected from the group consisting of polymers, oligomers, copolymers, and small molecules of carboxylates, acrylates, sulfates, sulfonates and combinations thereof; and
   a cross-linker selected from the group consisting of polyols having no more than six carbon atoms, polyamines, amino alcohols, polyepoxides and combinations thereof,
   wherein the scale control agent is cross-linked by the cross-linker by ester bonds, amide bonds, imide bonds or combinations thereof, wherein the size of the particle is from about 50 microns to about 4000 microns, and wherein the amount of the scale control agent in the particle is from about 30 wt % to about 95 wt % of the particle.

2. The cross-linked scale control agent particle of claim 1 wherein the scale control agent is selected from the group consisting of polymers, oligomers, and copolymers of at least one ethylenically unsaturated monomer.

3. The cross-linked scale control agent particle of claim 1 wherein the at least one ethylenically unsaturated monomer comprises acrylic acid, methacrylic acid, maleic acid, itaconic acid, 2-acrylamido-2-methyl propane sulfonic acid and combinations thereof.

4. The cross-linked scale control agent particle of claim 1 wherein the cross-linker acts as a corrosion inhibitor upon release and comprises an alkyl polyamine.

5. The cross-linked scale control agent particle of claim 1 wherein the particle has controlled release properties, wherein the scale control agent is released continuously for a period of up to about 12 months at a temperature of up to about 200° C., and wherein the scale control agent is released continuously for at least 12 hours at room temperature.

6. The cross-linked scale control agent particle of claim 1 wherein the particle when compressed under pressure of up to about 10 MPa has a compressibility in size of about 10% to about 75%.

7. The cross-linked scale control agent particle of claim 1 wherein the particle when compressed under pressure of up to around 1000 MPa has a compressibility in size of about 10% to about 90%.

8. A method for performing a mechanical fracturing operation using the cross-linked scale control agent particle of claim 1, the method comprising:
   mixing the particle with proppant and/or sand; and
   co-injecting the mixture into a well,
   wherein the mixture is lodged within a fracture region.

9. A method for reducing scale build up in an oil well, the method comprising:
   holding the cross-linked scale control agent particle of claim 1 in a permeable container, and
   suspending the permeable container in a well bore region, near well bore region, rathole, and combinations thereof.

10. A method for reducing scale build up in a cooling tower water supply, the method comprising:
holding the cross-linked scale control agent particle of claim 1 in a permeable container, and
suspending the permeable container in a cooling tower reservoir.

11. The cross-linked scale control agent particle of claim 1 further comprising a porous insoluble material, wherein the scale control agent is combined with the porous insoluble material such that the scale control agent is about 1 wt % to about 15 wt % of the cross-linked scale control particle.

12. A method for producing a cross-linked scale control agent particle, the method comprising the steps of:
mixing a scale control agent selected from the group consisting of polymers, oligomers, copolymers, and small molecules of carboxylates, acrylates, sulfates, sulfonates and combinations thereof and a cross-linker selected from the group consisting of polyols having no more than six carbon atoms, polyamines, amino alcohols, polyepoxides and combinations thereof;
subjecting the mixture to a temperature from about 20° C. to about 250° C. for up to about 72 hours; and
sizing the temperature subjected mixture to obtain a particle size from about 50 microns to about 4000 microns,
wherein the scale control agent is cross-linked by the cross-linker by ester bonds, amide bonds, imide bonds or combinations thereof, and wherein the amount of the scale control agent in the particle is from about 30 wt % to about 95 wt % of the particle.

13. The method of claim 12 further comprising the step of, prior to the subjecting step, adjusting the pH of the scale control agent and the cross-linker mixture to a pH optimum for cross-linking.

14. The method of claim 12 wherein the pH of the scale control agent and the cross-linker mixture is adjusted to a pH of about 2 to about 6.

15. The method of claim 14 wherein a hard acid is added in the mixing step to adjust the pH.

16. The method of claim 15 wherein the hard acid is selected from the group consisting of hydrochloric acid, sulfuric acid, and mixtures thereof.

17. The method of claim 12 wherein a reducing agent is added in the mixing step.

18. The method of claim 12 further comprising the step of, prior to the sizing step, compacting the temperature subjected mixture.

19. The method of claim 18 wherein a compression aid or a weighting agent is blended with the temperature subjected mixture during the compacting step.

20. The method of claim 19 further comprising the step of heating the blended mixture to a temperature from about 100° C. to about 250° C. for about 1 minute to about 12 hours.

21. The method of claim 18 further comprising the step of heating the sized mixture to a temperature from about 100° C. to about 250° C. for about 1 minute to about 12 hours.

22. The method of claim 12 further comprising the step of heating the sized mixture to a temperature from about 100° C. to about 250° C. for about 1 minute to about 12 hours.

23. The method of claim 12 wherein the particle has controlled release properties, wherein the scale control agent is released continuously for a period of up to about 12 months at a temperature of up to about 200° C., and wherein the scale control agent is released continuously for at least 12 hours at room temperature.

24. A method for controlling a controlled release profile of a cross-linked scale control agent particle comprising:
determining a desired controlled release profile;
selecting a cross-linker selected from the group consisting of polyols having no more than six carbon atoms, polyamines, amino alcohols, polyepoxides and combinations thereof based on the desired controlled release profile;
determining a required amount of the cross-linker based on the selected cross-linker and the desired controlled release profile; and
cross-linking a scale control agent selected from the group consisting of polymers, oligomers, copolymers, and small molecules of carboxylates, acrylates, sulfates, sulfonates and combinations thereof using the selected cross-linker,
wherein the scale control agent is cross-linked by the cross-linker by ester bonds, amide bonds, imide bonds or combinations thereof, and wherein the size of the particle is from about 50 microns to about 4000 microns.

25. A cross-linked scale control agent particle suitable for use in oilfield applications comprising:
a scale control agent selected from the group consisting of polymers, oligomers, and copolymers of an ethylenically unsaturated monomer comprising acrylic acid, methacrylic acid, maleic acid, itaconic acid, 2-acrylamido-2-methyl propane sulfonic acid and combinations thereof; and
a cross-linker selected from the group consisting of polyols having no more than six carbon atoms, polyamines, amino alcohols, polyepoxides and combinations thereof,
wherein the scale control agent is cross-linked by the cross-linker, wherein the size of the particle is from about 425 microns to about 850 microns, wherein the amount of the scale control agent in the particle is from about 80 wt % to about 95 wt % of the particle, and wherein the size of the particle is from about 50 microns to about 4000 microns.

26. A cross-linked scale control agent particle suitable for use in oilfield applications comprising:
a cross-linked scale control agent, and
a porous insoluble material,
wherein the scale control agent is selected from the group consisting of polymers, oligomers, copolymers, and small molecules of carboxylates, acrylates, sulfates, sulfonates and combinations thereof and is cross-linked by a cross-linker selected from the group consisting of polyols having no more than six carbon atoms, polyamines, amino alcohols, polyepoxides and combinations thereof by ester bonds, amide bonds, imide bonds- or combinations thereof, wherein the size of the particle is from about 50 microns to about 4000 microns, and wherein the amount of the scale control agent in the combined scale control agent and porous insoluble material is from about 1 wt % to about 15 wt %.

27. The cross-linked scale control agent particle of claim 26 wherein the porous insoluble material is selected from the group consisting of inorganic particles, inorganic granules, natural particles, natural granules and combinations thereof.

28. The cross-linked scale control agent particle of claim 26 wherein the porous insoluble material is selected from the group consisting of porous proppants, sintered diatomaceous earth, ceramics, natural corn cob fibers and combinations thereof.

29. A scale control composition comprising:
at least one scale control agent selected from the group consisting of polymers, oligomers, copolymers, and small molecules of carboxylates, acrylates, sulfates, sulfonates and combinations thereof,
a cross-linker selected from the group consisting of polyols having no more than six carbon atoms, polyamines, amino alcohols, polyepoxides and combinations thereof, and
a porous material,
wherein the scale control agent and the cross-linker are imbibed into the porous material and the scale control agent is then cross-linked by the cross-linker, and wherein the amount of the scale control agent in the scale control composition is from about 1 wt % to about 15 wt %.

30. The scale control composition of claim 29, wherein the porous material has pore volume of less than about 55%.

31. The scale control composition of claim 29, wherein the porous material is sintered diatomaceous earth having a particle size of between about 225 microns and about 1700 microns.

* * * * *